United States Patent
Chung et al.

(10) Patent No.: US 12,270,419 B2
(45) Date of Patent: Apr. 8, 2025

(54) ELECTRIC TOOL

(71) Applicant: TECHTRONIC CORDLESS GP, Anderson, SC (US)

(72) Inventors: Koon For Chung, Kwai Chung (CN); Yan Jia Wang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 17/695,239

(22) Filed: Mar. 15, 2022

(65) Prior Publication Data

US 2022/0307518 A1    Sep. 29, 2022

(30) Foreign Application Priority Data

Mar. 23, 2021   (CN) .......................... 202110316414.5
Aug. 18, 2021   (CN) .......................... 202110948998.8

(51) Int. Cl.
*F04D 29/66* (2006.01)
*A01G 20/47* (2018.01)
*F04D 17/10* (2006.01)

(52) U.S. Cl.
CPC ........... *F04D 29/664* (2013.01); *A01G 20/47* (2018.02); *F04D 17/10* (2013.01)

(58) Field of Classification Search
CPC ................ F04D 29/664; F04D 53/001; F04D 2201/0804; A01G 20/47; A47L 5/14; F04B 53/001; F04B 2201/0804
See application file for complete search history.

(56) References Cited

U.S. PATENT DOCUMENTS

| | | | |
|---|---|---|---|
| 3,924,291 A | 12/1975 | Tschudy | |
| 4,615,069 A | 10/1986 | Henning | |
| 5,560,078 A * | 10/1996 | Toensing | A47L 9/0081 15/330 |
| 5,975,862 A | 11/1999 | Arahata | |
| 5,979,013 A * | 11/1999 | Beckey | A47L 9/0081 15/326 |
| 6,105,206 A | 8/2000 | Tokumaru | |
| 6,158,082 A | 12/2000 | Beckey | |
| 6,324,721 B2 | 6/2001 | Doragrip | |

(Continued)

FOREIGN PATENT DOCUMENTS

| | | |
|---|---|---|
| AU | 2017100881 | 8/2017 |
| CA | 2487793 | 6/2005 |

(Continued)

OTHER PUBLICATIONS

European Search Report Corresponding with Application No. EP22159903 on Aug. 26, 2022 (2 pages).

(Continued)

*Primary Examiner* — Courtney D Heinle
*Assistant Examiner* — Danielle M. Christensen
(74) *Attorney, Agent, or Firm* — Dority & Manning, P.A.

(57) ABSTRACT

Disclosed in the present invention is an electric tool, comprising: a housing, comprising a first opening; working equipment; a power apparatus, at least partially located in the housing and driving the working equipment; a surrounding structure, at least partially surrounding the power apparatus, the surrounding structure defining a second opening; and a blocking structure located between the first opening and the second opening.

20 Claims, 23 Drawing Sheets

(56) References Cited

U.S. PATENT DOCUMENTS

| | | | |
|---|---|---|---|
| 6,305,048 B1 | 10/2001 | Salisian | |
| 6,324,720 B1 | 12/2001 | Beckey | |
| 6,370,729 B2 | 4/2002 | Miyamoto | |
| 6,468,053 B2 | 10/2002 | Wolpert | |
| 6,575,695 B1 | 6/2003 | Miyamoto | |
| 7,774,896 B2 | 8/2010 | Andresen | |
| 9,004,854 B2 | 4/2015 | Nakazawa | |
| 10,065,219 B2* | 9/2018 | Suzuki | A01G 20/47 |
| 10,330,116 B2 | 6/2019 | Bylund | |
| 10,670,048 B2 | 6/2020 | Landén | |
| 10,753,364 B2 | 8/2020 | Yamaoka | |
| 2007/0294855 A1 | 12/2007 | Iida | |
| 2009/0241285 A1 | 10/2009 | Hinklin et al. | |
| 2011/0132900 A1* | 6/2011 | Kinoshita | F24C 7/04 |
| | | | 219/443.1 |
| 2011/0200426 A1 | 8/2011 | Takano | |
| 2013/0293164 A1 | 11/2013 | Sakakibara | |
| 2015/0377253 A1 | 12/2015 | Shibata | |
| 2016/0298635 A1 | 10/2016 | Su | |
| 2020/0214229 A1 | 7/2020 | Yamaoka et al. | |
| 2020/0221651 A1 | 7/2020 | Klingler | |
| 2020/0245835 A1* | 8/2020 | Iwakami | A47L 9/22 |
| 2020/0383534 A1 | 12/2020 | Sato | |
| 2020/0390041 A1 | 12/2020 | Koide | |
| 2021/0007293 A1 | 1/2021 | Stimpson | |
| 2021/0146523 A1 | 5/2021 | Blatz | |

FOREIGN PATENT DOCUMENTS

| | | |
|---|---|---|
| CA | 2972042 | 12/2017 |
| CN | 1811072 | 8/2006 |
| CN | 102162473 | 8/2011 |
| CN | 102482856 | 5/2012 |
| CN | 103016586 | 4/2013 |
| CN | 106714642 | 5/2017 |
| CN | 107268501 | 10/2017 |
| CN | 107269550 | 10/2017 |
| CN | 107558421 | 1/2018 |
| CN | 107558422 | 1/2018 |
| CN | 107558423 | 1/2018 |
| CN | 107645907 | 1/2018 |
| CN | 109371888 | 2/2019 |
| CN | 208577992 | 3/2019 |
| CN | 109578333 | 4/2019 |
| CN | 110453633 | 11/2019 |
| CN | 111486128 | 8/2020 |
| CN | 112081763 | 12/2020 |
| CN | 212318333 | 1/2021 |
| CN | 212318334 | 1/2021 |
| DE | 10060181 | 6/2001 |
| DE | 19959557 | 6/2001 |
| DE | 102005003275 | 7/2006 |
| DE | 102015008189 | 12/2015 |
| DE | 202015007933 U1 | 12/2015 |
| DE | 102018251706 | 7/2020 |
| DE | 202020001322 | 8/2020 |
| DE | 202020002177 | 8/2020 |
| DE | 102020003384 | 12/2020 |
| EP | 0968644 | 1/2000 |
| EP | 2360378 | 8/2011 |
| EP | 3262922 | 1/2018 |
| EP | 3302024 | 4/2018 |
| EP | 3358083 | 8/2018 |
| EP | 3649847 | 5/2020 |
| EP | 3682730 | 7/2020 |
| FR | 2802131 | 6/2001 |
| WO | WO2011016101 | 2/2011 |
| WO | WO2016044268 | 3/2016 |
| WO | WO2016188583 | 12/2016 |
| WO | WO2018164145 | 9/2018 |
| WO | WO2020136077 | 7/2020 |
| WO | WO2020189226 A1 | 9/2020 |

OTHER PUBLICATIONS

European Search Report Corresponding with Application No. EP21216243 on Jun. 16, 2022 (2 pages).

* cited by examiner

ELECTRIC TOOL

This application claims the benefit of priority to Chinese Patent Application No. 202110316414.5, filed on Mar. 23, 2021, and Chinese Patent Application No. 202110948998.8, filed on Aug. 18, 2021, the disclosures of all of which are incorporated by reference herein in their entireties

TECHNICAL FIELD

The present invention relates to an electric tool having a noise reduction structure, in particular to a centrifugal blower having a noise reduction structure.

BACKGROUND ART

Power apparatuses (e.g. motors, etc.) and working equipment (e.g. fans, etc.) of electric tools are often the main sources of noise. Taking leaf blowers as an example, these are mainly used for blowing away fallen leaves, road surface dust, accumulated water and accumulated snow, etc. Depending on fan type, blowers can be categorized as axial-flow, centrifugal and mixed-flow, with centrifugal blowers and mixed-flow blowers generating the most noise; the fan and the motor driving the fan in the blower are the main sources of noise.

One objective of the present invention is to design a noise reduction structure for an electric tool. The noise reduction structure can make use of conventional components of the electric tool, and achieve the effect of reducing noise by improving the arrangement of conventional components and reducing the number of other additional components as much as possible.

SUMMARY OF THE INVENTION

The present invention is intended to provide an electric tool having a noise reduction structure.

Those skilled in the art will derive other objectives of the present invention from the following description. Thus, the statement of the object above is not exhaustive, and merely intended to explain some of the many objects of the present invention.

To achieve the above objective, the present invention provides an electric tool, comprising: a housing, comprising a first opening; working equipment; a power apparatus, at least partially located in the housing and driving the working equipment; and a surrounding structure, located in the housing and at least partially surrounding the power apparatus, the surrounding structure defining a second opening, and the first opening and the second opening having different orientations.

In some embodiments, the orientation of the first opening is at right angles to the orientation of the second opening.

In some embodiments, the first opening is a ventilation port.

In some embodiments, the electric tool further comprises a blocking structure located between the first opening and the second opening.

In some embodiments, the blocking structure is arranged close to the first opening, the blocking structure is preferably arranged substantially parallel to a housing outer surface close to the first opening, and the blocking structure is more preferably formed as part of the housing.

In some embodiments, the housing comprises multiple baffles located in the interior thereof. In some embodiments, the surrounding structure surrounds the power apparatus circumferentially, and a height of the surrounding structure is preferably greater than a height of the power apparatus.

In some embodiments, the electric tool further comprises a control apparatus located close to the second opening; the second opening is preferably located at an axially far end of the power apparatus, and the control apparatus is located above the second opening.

In some embodiments, a maximum dimension of the control apparatus is larger than a dimension of the second opening; the control apparatus preferably comprises a control circuit board and a cooling apparatus having the control circuit board mounted thereon, and a maximum dimension of the cooling apparatus is larger than a dimension of the second opening.

In some embodiments, the working equipment is fixed to the housing by means of the surrounding structure, and one or more vibration-reducing members are preferably provided between the housing and the surrounding structure.

In some embodiments, at least one of the surrounding structure, the blocking structure and the vibration-reducing member is formed of a sound-absorbing material.

In some embodiments, the electric tool further comprises an inlet assembly, the inlet assembly comprising at least one inlet in fluid communication with the working equipment, the at least one inlet being oriented at an angle to an axis of the working equipment, the angle preferably being 90 degrees, and one or more vibration-reducing members are more preferably provided between the inlet assembly and the working equipment.

In some embodiments, the at least one inlet comprises multiple inlets arranged along a circumference, the multiple inlets being defined by multiple adjacent blades, and the multiple blades are preferably arranged along the circumference and constructed so that an air stream enters the inlet assembly substantially in the direction of a tangent to the circumference.

In some embodiments, the inlet assembly comprises a bottom face extending in a plane perpendicular to an axis of the working equipment, the bottom face preferably comprising a sound-absorbing material.

In some embodiments, the electric tool is a centrifugal blower.

BRIEF DESCRIPTION OF THE FIGURES

The above-described and additional characteristics of the present invention will become apparent from the following description of preferred embodiments provided only as examples and in conjunction with the drawings. Among the drawings.

DETAILED DESCRIPTION OF EMBODIMENTS

In the subsequent claims and the foregoing description of the present invention, unless otherwise required by the context due to the language of expression or necessary implication, the term "comprise" or, for example, a variant (for example, "include" or "contain") is used in an inclusive manner, i.e., to indicate the existence of the feature, without excluding the presence or addition of other features in the various embodiments of the present invention.

For example, "horizontal", "vertical", "transverse", "longitudinal", "above", "below" and similar terms used herein are for the purpose of describing the present invention in the orientation of the invention in normal use, and are not intended to limit the present invention to any specific orientation.

It should be understood that if any publication of prior art is cited herein, such a reference does not constitute an admission that the publication forms part of common knowledge in the art in any country.

A description is given below with reference to the drawings and embodiments.

Figure 1:
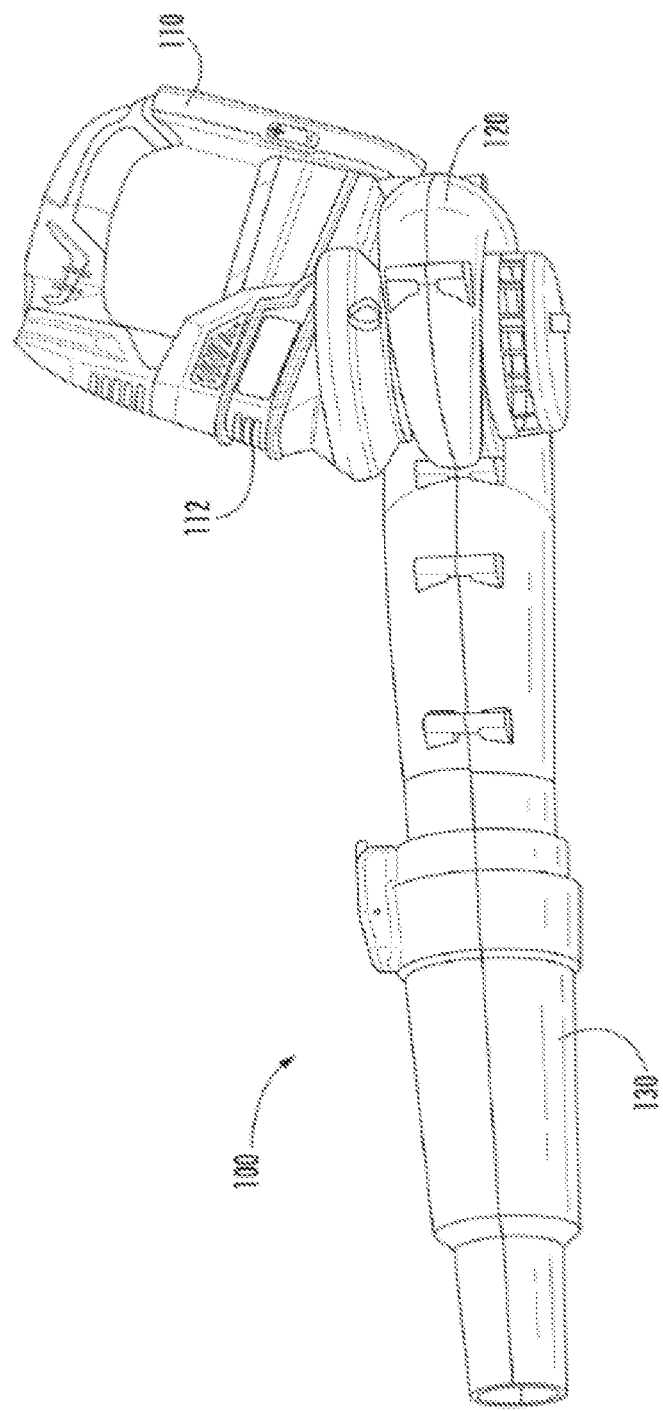
FIG. 1 shows a schematic diagram of an electric tool according to an embodiment of the present invention.

FIG. 1 shows a schematic diagram of an electric tool according to an embodiment of the present invention. In this embodiment, the electric tool is a centrifugal blower 100. Those skilled in the art will understand that the various noise reduction structures in the present invention may also be applied in other electric tools, e.g. any electric tool having a motor. The electric tool may have a housing with any shape and function. In the embodiment shown in FIG. 1, the housing of the centrifugal blower 100 comprises a main housing 110, a turbine housing 120 and a wind tube 130. The main housing 110, turbine housing 120 and wind tube 130 may be integrally formed, or formed by joining together multiple components. FIG. 1 shows a first opening 112 defined by the main housing 110, wherein the first opening 112 forms a set of ventilation ports. The first opening 112 may be arranged at another position on the housing, and is not limited to being used as ventilation ports.

Figure 2:
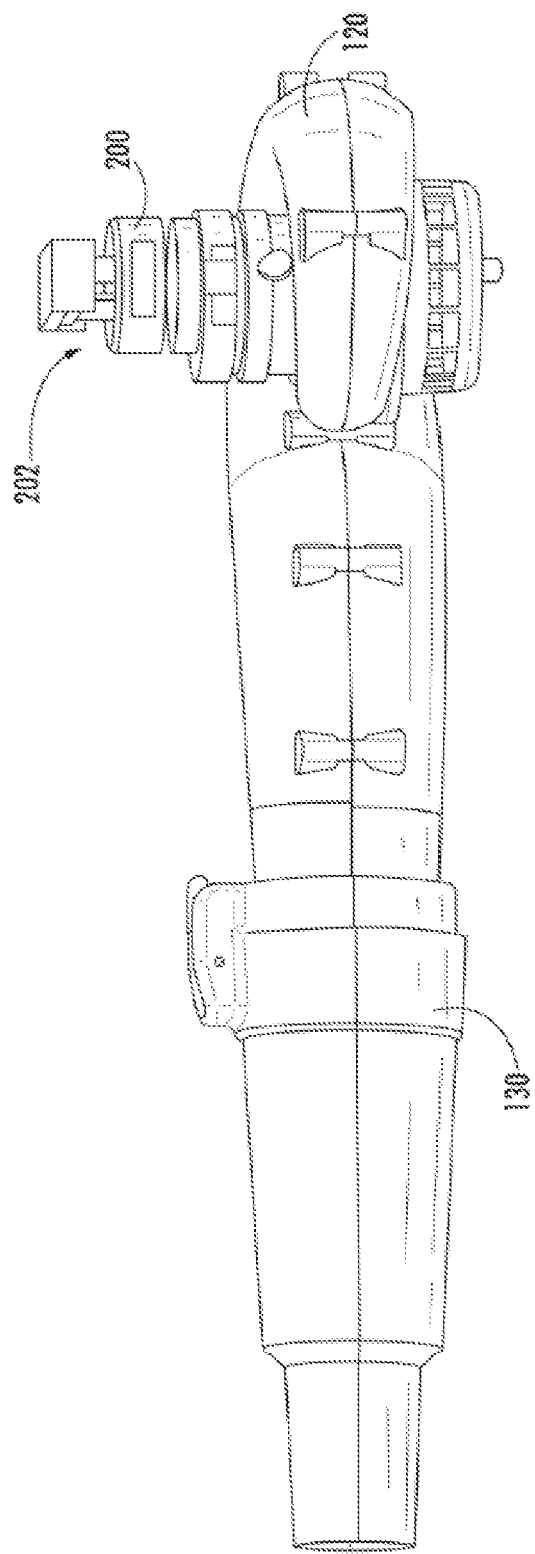
FIG. 2 shows a schematic diagram of a surrounding structure surrounding a power apparatus according to an embodiment of the present invention.
Figure 4:
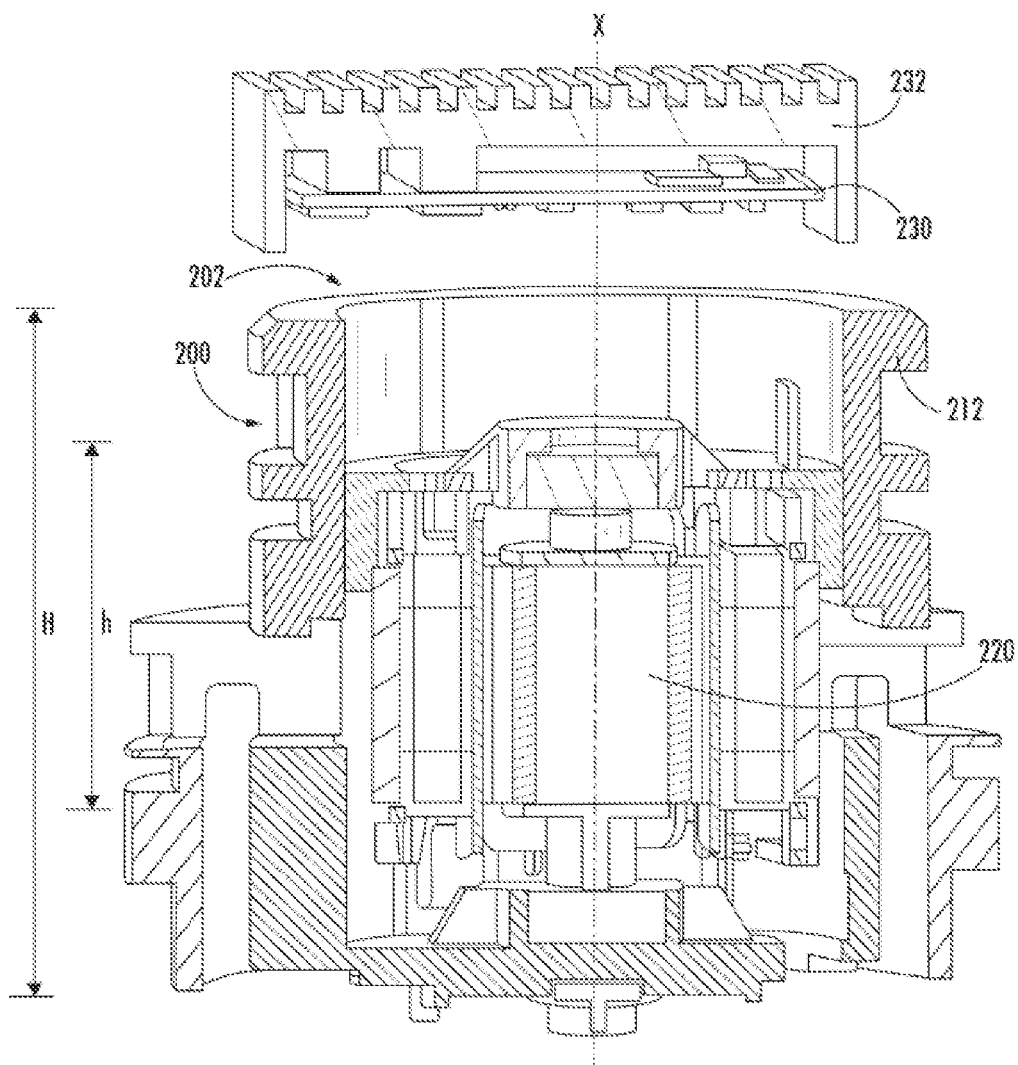
FIG. 4 shows a sectional diagram of the power apparatus, surrounding structure and control apparatus according to an embodiment of the present invention.
Figure 21:
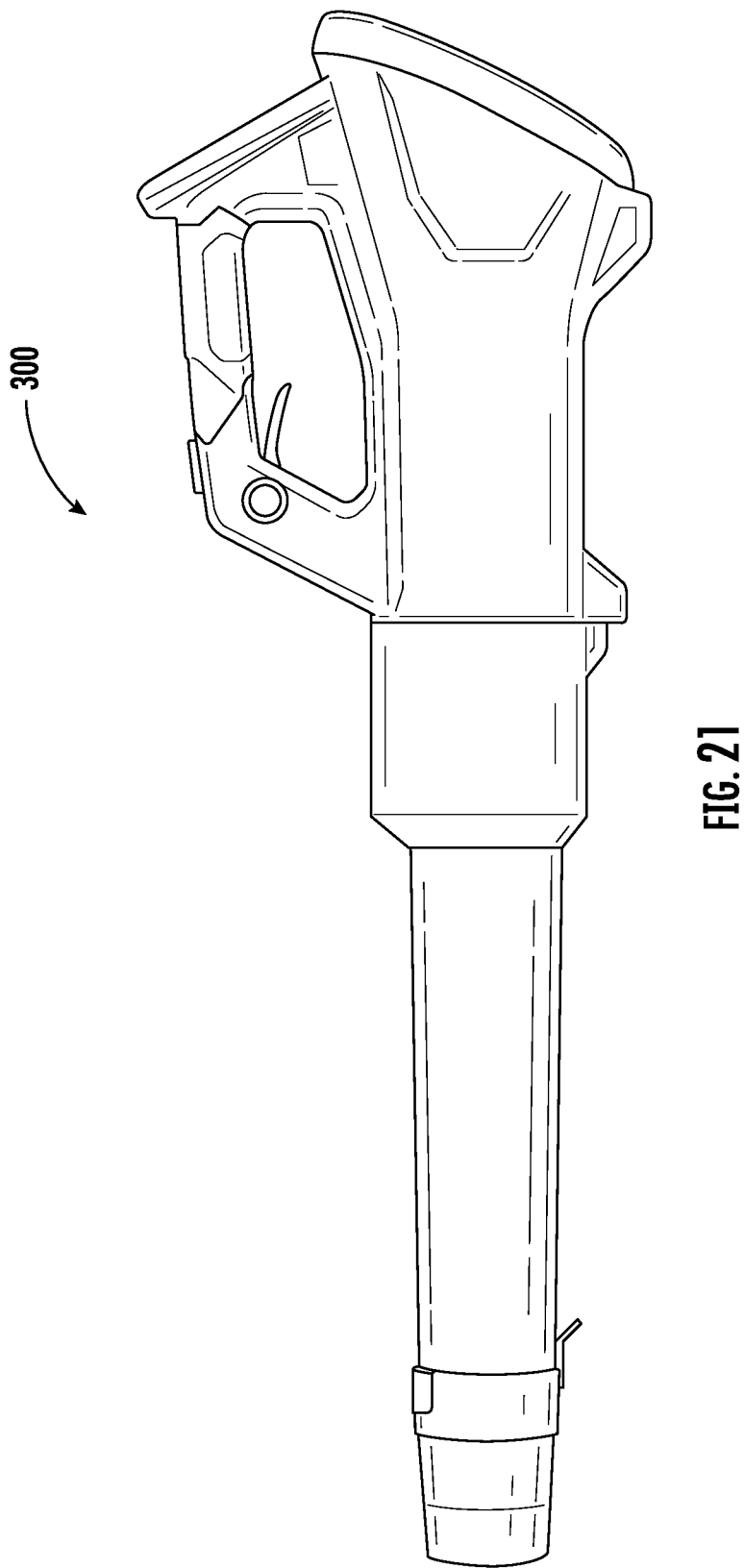
FIG. 21 shows a schematic diagram of an electric tool according to an embodiment of the present invention.
Figure 22:
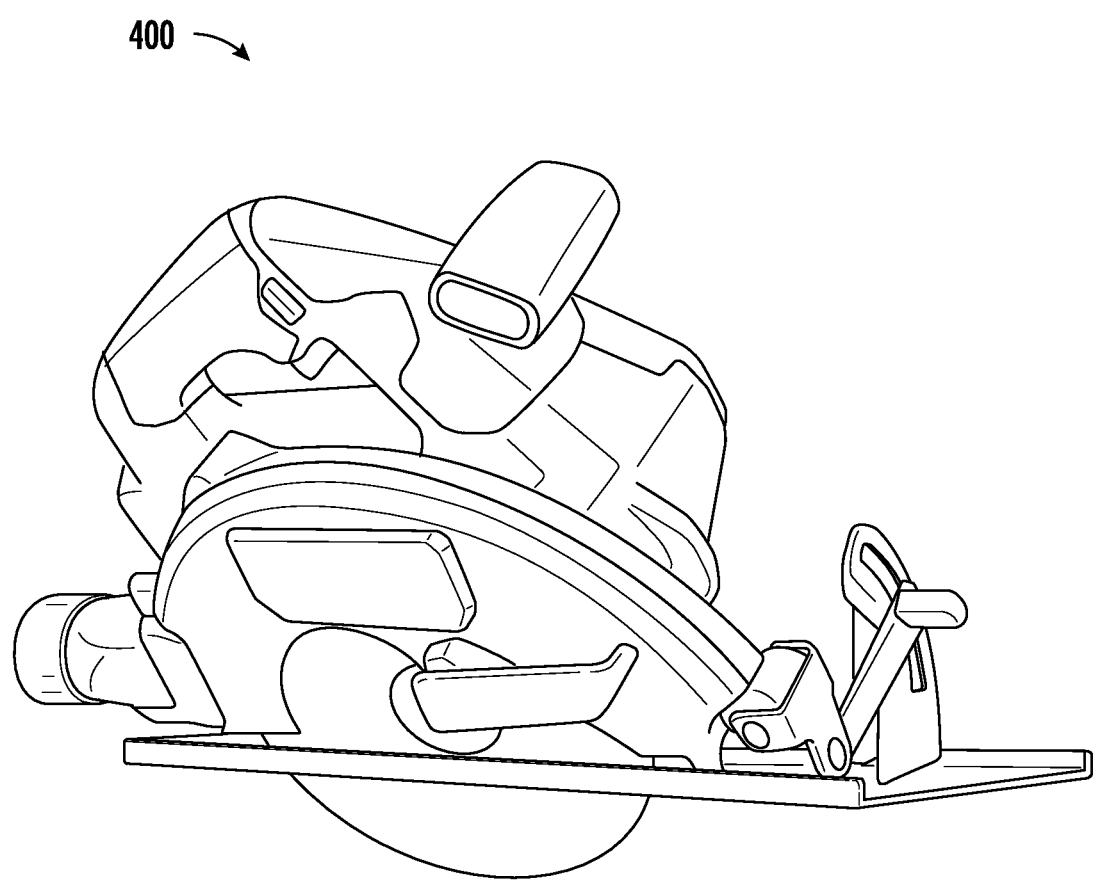
FIG. 22 shows a schematic diagram of an electric tool according to an embodiment of the present invention.
Figure 23:
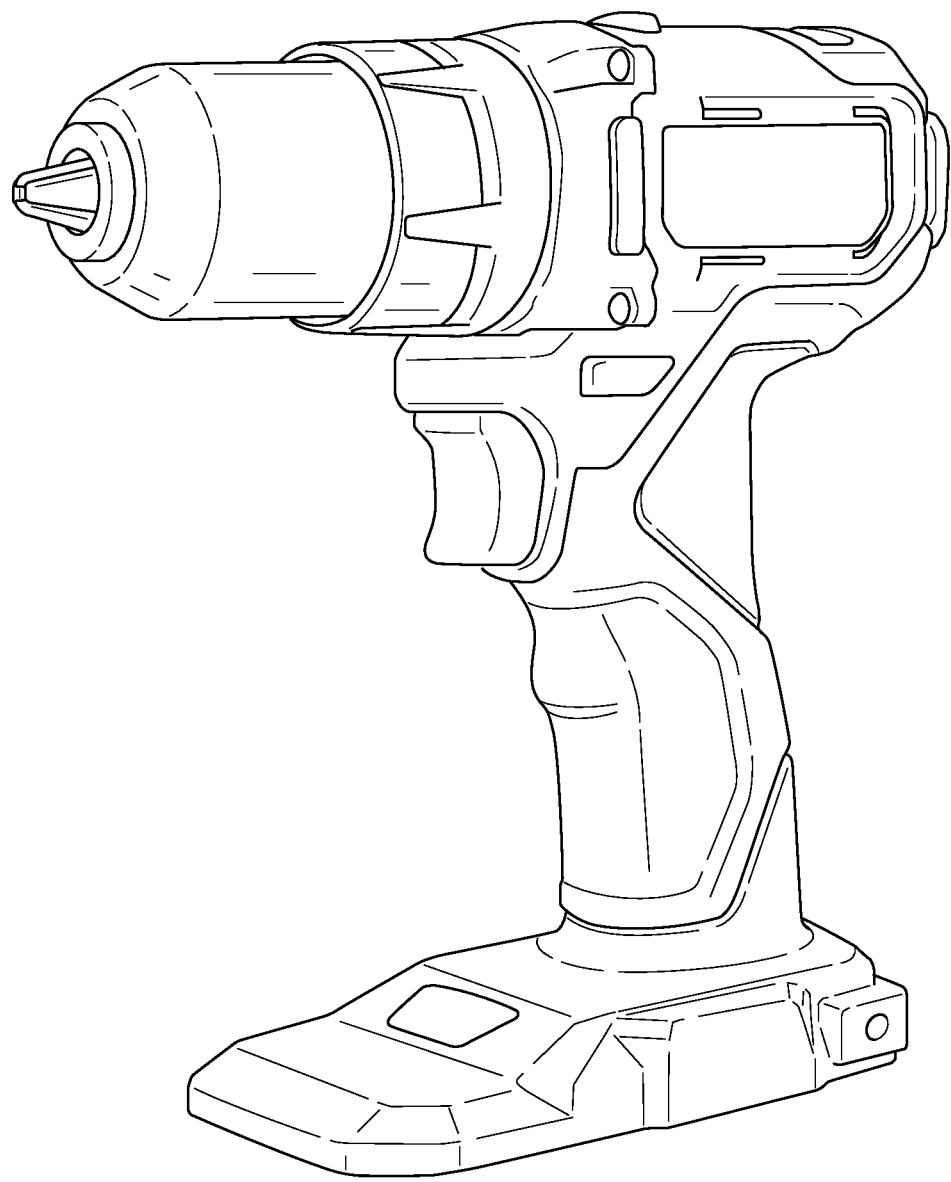
FIG. 23 shows a schematic diagram of an electric tool according to an embodiment of the present invention.

FIG. 2 shows a schematic diagram of a surrounding structure 200 surrounding a power apparatus according to an embodiment of the present invention. In the embodiment of the centrifugal blower 100 shown in FIG. 1, the power apparatus is a motor 220 (FIG. 4). In some embodiments, the power apparatus is not limited to a motor, e.g. may also comprise a transmission component, etc. The power apparatus is used to drive working equipment. In an embodiment of the centrifugal blower 100, the working equipment is a centrifugal fan (not shown) located inside the turbine housing 120. In some embodiments, the working equipment may also be an axial-flow fan 300 (FIG. 21), a cutter 400 (FIG. 22) or a drill 500 (FIG. 23), etc. For simplicity of description, the working machinery will be represented by a centrifugal fan (or simply, fan) hereinbelow. The motor 220 is at least partially located in the main housing 110. It will be understood that the motor 220 may also be arranged in other parts of the housing. The surrounding structure 200 is located in the main housing 110, and at least partially surrounds the power apparatus. The surrounding structure 200 defines a second opening 202, the second opening 202 being located at an axially far end of the motor 220.

Figure 3:
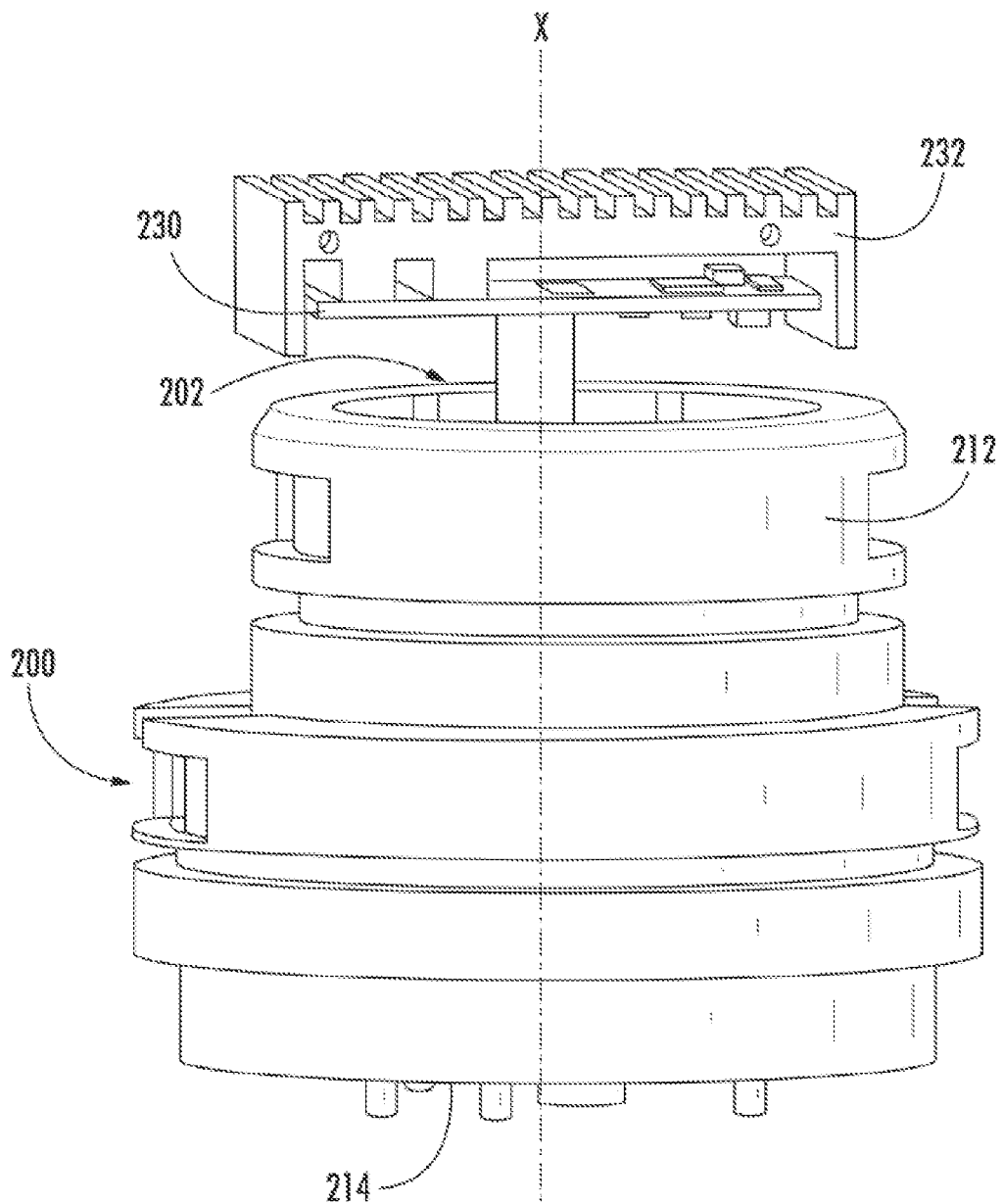
FIG. 3 shows a schematic diagram of the surrounding structure and a control apparatus according to an embodiment of the present invention.

FIG. 3 shows a schematic diagram of the surrounding structure 200 and a control apparatus according to an embodiment of the present invention. The surrounding structure 200 surrounds the power apparatus circumferentially. Specifically, the surrounding structure 200 comprises a peripheral face 212 surrounding the motor 220, and a bottom part 214, and defines the second opening 202 thereabove. The surrounding structure 200 may comprise only the peripheral face 212, or the surrounding structure 200 may comprise the peripheral face 212, the bottom part 214 and a top face, wherein the second opening may be formed on any side of any one of these. In some embodiments, the surrounding structure 200 serves as a power apparatus mounting support, fixing the power apparatus relative to the main housing 110. In the embodiment shown in FIG. 3, the surrounding structure 200 forms a supporting housing or mounting seat of the motor 220. The surrounding structure 200 is substantially columnar, and may be a regular or irregular cylinder or prism. Multiple mounting structures may be formed on the peripheral face 212 and/or bottom part 214 of the surrounding structure 200, to enable fixing to the main housing 110. The surrounding structure 200 may be integrally formed, or formed by joining together multiple components. In the embodiment shown in FIG. 3, the surrounding structure 200 is integrally formed, being formed by stacking concentric cylinders of different radii in the axial direction of the motor 220 indicated by X; these cylinders may be matched to the internal shape of the main housing 110, or may be set as required.

Figure 5:
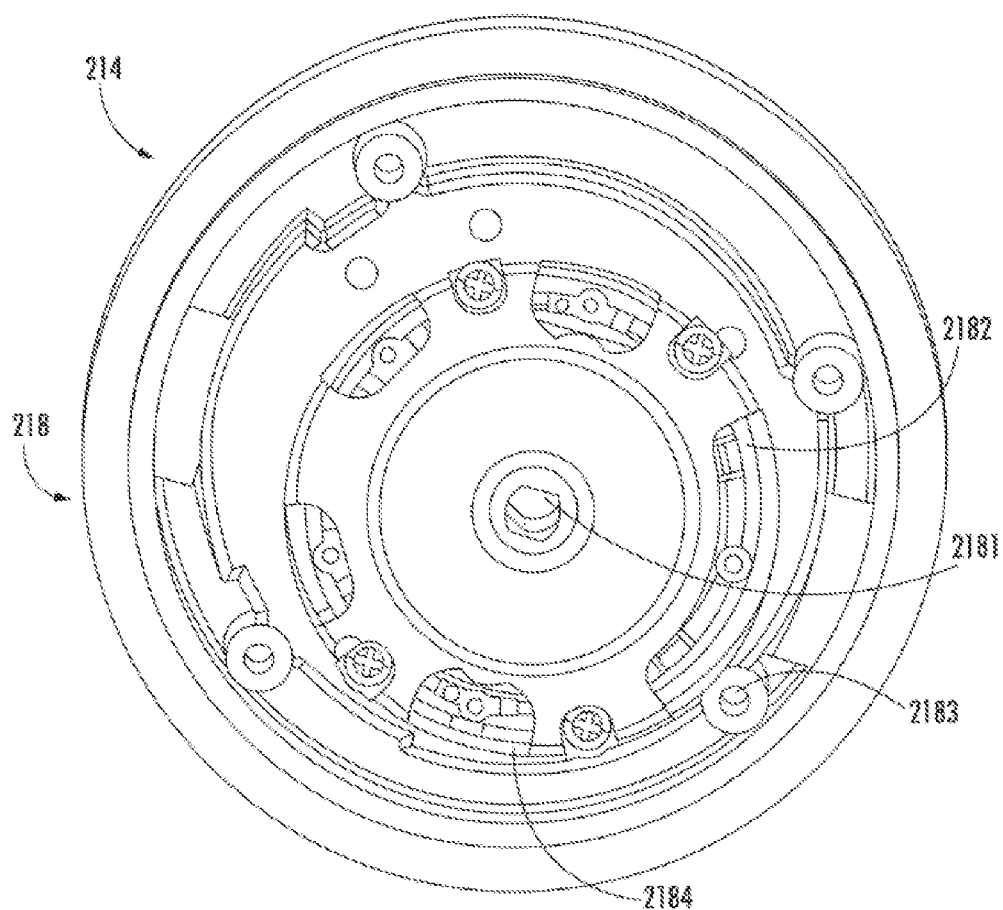
FIG. 5 shows a schematic diagram of a bottom part of the surrounding structure according to an embodiment of the present invention.

The surrounding structure 200 may be provided with a third opening 218 on the peripheral face 212 and/or bottom part 214 as required (FIG. 5). The functions of the second opening 202 and/or third opening 218 may include any of the following, or a combination thereof: outputting the motive power generated by the power apparatus to the fan via the third opening 218, leading electronic lines in or out, a mounting hole, and serving as a ventilation port for air circulation. The form of the third opening 218 may be a through-hole as shown in the embodiment in FIG. 5, etc.

In the embodiment shown in FIG. 3, the control apparatus comprises a circuit board 230. In some embodiments, the control apparatus may have a form other than the circuit board 230, or the control apparatus comprises the circuit board 230 and other related components. In the embodiment shown in FIG. 3, the circuit board 230 is located at the axially far end of the motor 220, above the second opening 202. The circuit board 230 and surrounding structure 200 are separated by a certain distance, to facilitate heat dissipation from the motor 220 and the circuit board 230. In some embodiments, the control apparatus may be located close to the second opening 202. In some embodiments, the electrical connection of the power apparatus and the control apparatus is via the second opening 202. In the embodiment shown in FIG. 3, a dimension of the circuit board 230 is larger than a dimension of the second opening 202. In some embodiments, a dimension of the circuit board 230 is comparable to a dimension of the second opening 202, or smaller than a dimension of the second opening 202. If the dimension of the circuit board 230 is larger than the dimension of the second opening 202, this helps to reduce noise.

In the embodiment shown in FIG. 3, the control apparatus further comprises a cooling apparatus 232 mounted above the circuit board 230; a maximum dimension of the cooling apparatus 232 is larger than a dimension of the second opening 202. In some embodiments, the control apparatus may not comprise the cooling apparatus 232, or the cooling apparatus 232 is arranged close to the circuit board 230, or a dimension of the cooling apparatus 232 is comparable to a dimension of the second opening 202 or smaller than a dimension of the second opening 202. If the dimension of the cooling apparatus 232 is larger than the dimension of the second opening 202, this helps to reduce noise.

The control apparatus and surrounding structure 200 together form a cover which surrounds the power apparatus, serving to isolate sound and reduce noise. As can be seen from FIG. 3, a plane of extension of the control apparatus and a plane of extension of the bottom part 214 of the surrounding structure 200 are arranged substantially in parallel. As will be understood, the two planes may also be arranged to have an acute angle therebetween. The acute angle may be a small angle; a small angle or a zero angle helps to restrict noise to the interior of the surrounding structure 200. In addition to absorbing or isolating noise, the functions of the surrounding structure 200 may also include any of the following, or a combination thereof: support and/or mounting of the power apparatus, and assisting heat dissipation from the power apparatus. Thus, the surrounding structure 200 may employ a heat-conducting material or a sound-absorbing material, or both.

FIG. 4 shows a sectional diagram of the power apparatus, surrounding structure 200 and control apparatus according to an embodiment of the present invention. As can be seen, in the axial direction, the height H of the surrounding structure 200 is greater than the height h of the motor 220, and may be 1-2 times the height h of the motor 220, or longer. The greater height of the surrounding structure 200 compared with the height of the power apparatus helps to reduce noise. In the embodiment shown in FIG. 4, the height H of the surrounding structure 200 in the axial direction is about 1.4 times the height h of the motor 220 (not counting an outward-extending drive shaft).

FIG. 5 shows a schematic diagram of the bottom part 214 of the surrounding structure 200 according to an embodiment of the present invention. In the embodiment shown in FIG. 5, the bottom part 214 has an opening for an output shaft of the motor 220 to pass through. In some embodiments, at least one third opening 218 is defined in the bottom part 214, including but not limited to a through-hole 2181 through which the drive shaft of the motor 220 passes, a mounting through-hole for a fixing member to pass through in order to fix the motor 220, or through-holes 2182, 2183, 2184 which assist heat dissipation from the motor 220.

Figure 6:
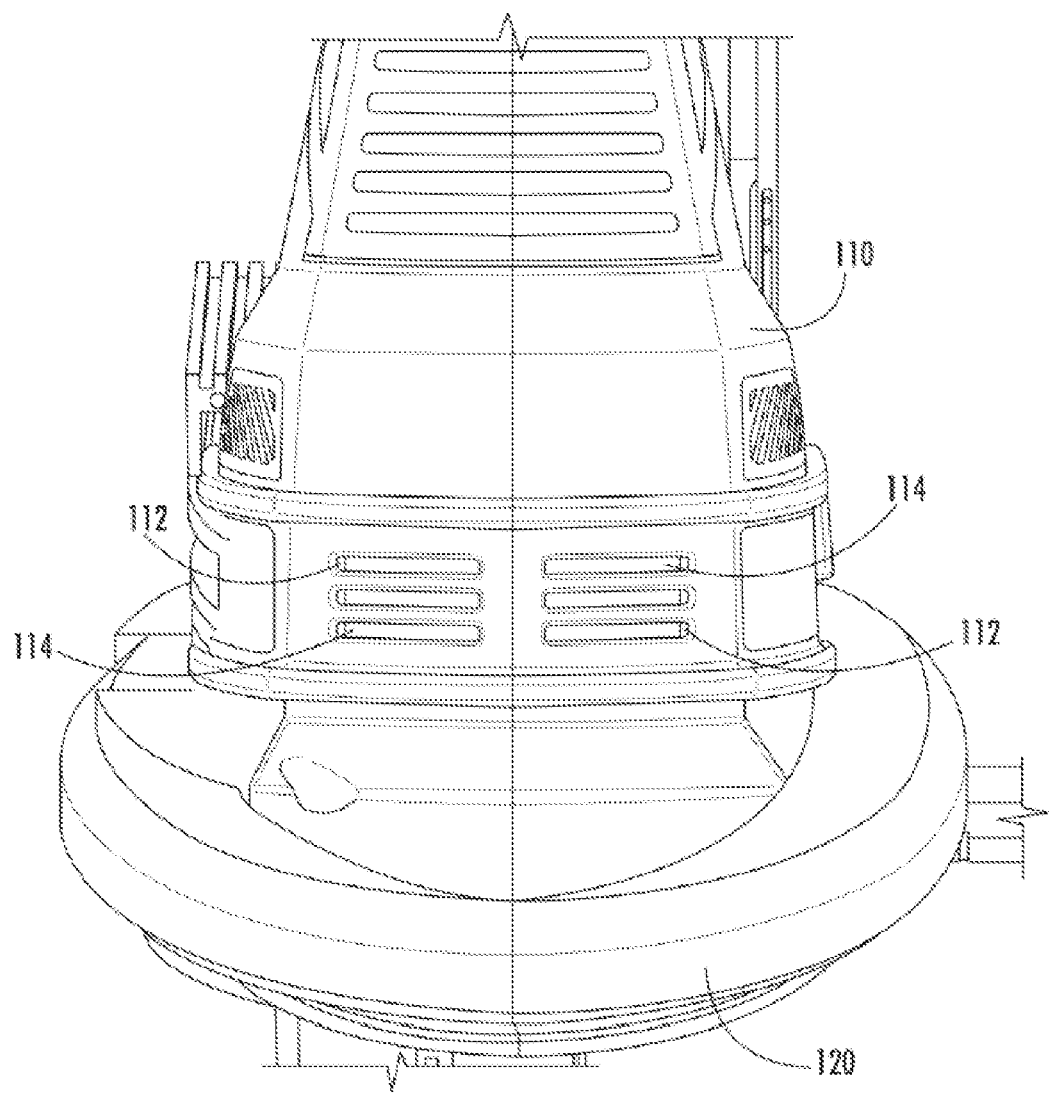
FIGS. 6 and 7 show schematic diagrams of a blocking structure according to an embodiment of the present invention.
Figure 7:
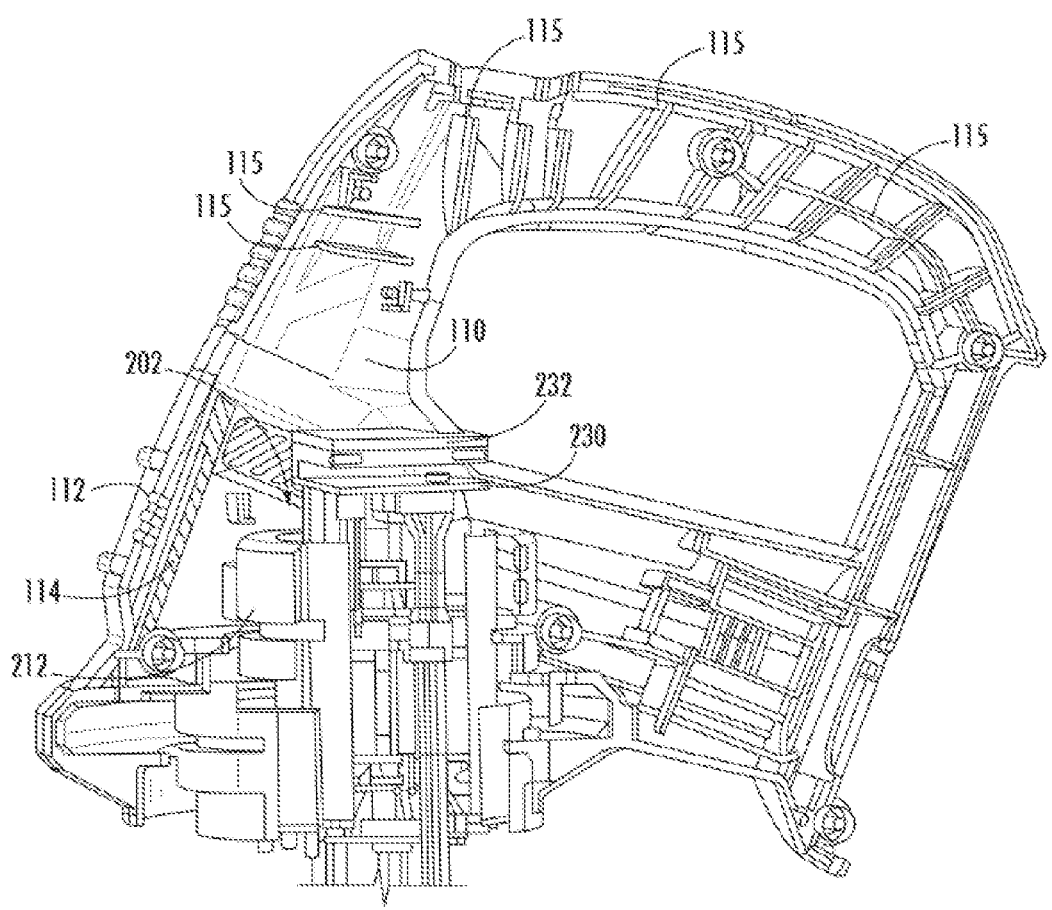

FIGS. 6 and 7 show schematic diagrams of a blocking structure 114 according to an embodiment of the present invention. Because the blocking structure 114 is located inside the main housing 110, in the front view of FIG. 6 it is only possible to see the first opening 112 and part of the blocking structure 114 behind the first opening 112. FIG. 7 shows a sectional diagram of the internal structure; an oblique shaded part (a cross section of the blocking structure 114) is clearly shown, the blocking structure 114 being located between the first opening 112 and the second opening 202, wherein the first opening 112 and the second opening 202 have different orientations, thus forming an angle. This angle is preferably a right angle. The first opening 112 may be closest to the second opening 202. The blocking structure 114 may be arranged at a position closer to the first opening 112, preferably substantially parallel to a housing outer surface close to the first opening 112, and is preferably formed as part of the housing. As shown in FIGS. 6 and 7, multiple sets of ventilation ports are provided on the main housing 110; the first opening may be any set of ventilation ports, and the cooling apparatus 232 may also be regarded as a blocking structure.

The function of the blocking structure is to prevent the transmission of noise generated by the power apparatus to the outside of the electric tool through the second opening and first opening. For example, the blocking structure 114 should be arranged such that air can go around the periphery of the blocking structure 114, i.e. blocking a direct pathway for noise but not obstructing air circulation. As will be understood, the blocking structure 114 may also be arranged at an acute angle to the housing outer surface close to the first opening 112; this acute angle may be a small angle. A small angle or a zero angle helps to restrict noise to the interior of the housing. More than one blocking structure may be provided as required, or the blocking structure may correspond to one or more first openings. The material of the blocking structure may be formed of a sound-absorbing material, or may be the same material as that of the housing. In order to further reduce noise, as shown in FIG. 7, multiple baffles 115 are also provided inside the main housing 110; in FIG. 7, the positions of only five of these baffles 115 are marked representatively. The function of the multiple baffles 115 is to enable noise to be continually reflected inside the housing, to achieve the goal of attenuating noise. The material of the baffles 115 may be formed of a sound-absorbing material, or may be the same material as that of the housing.

Figure 8:
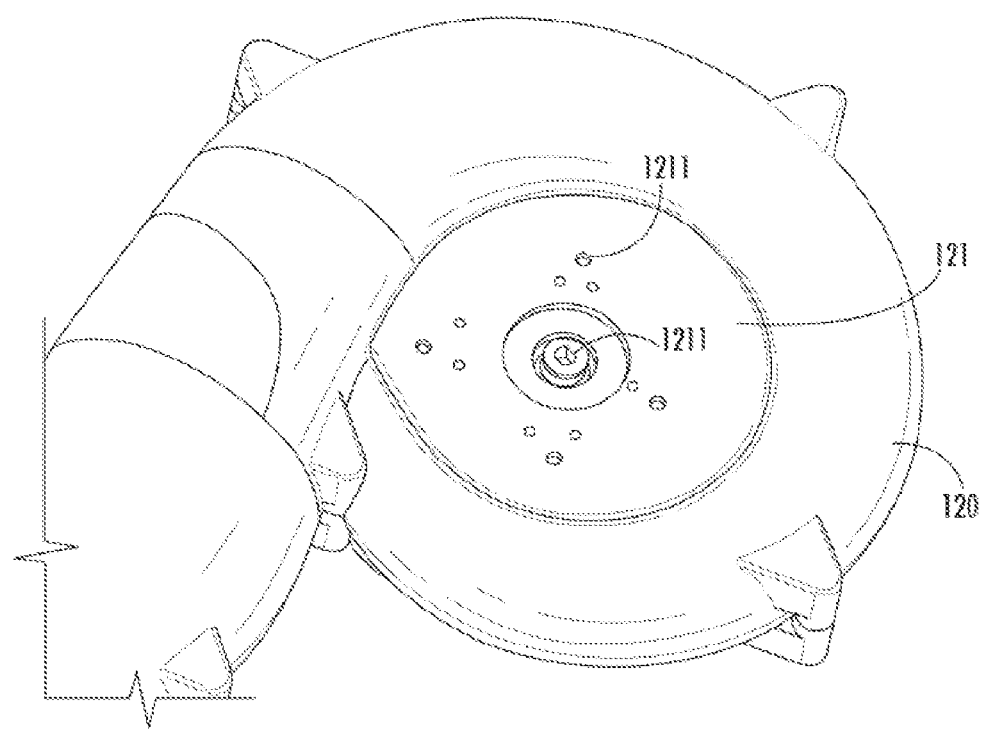
FIG. 8 shows a schematic diagram of a shielding structure according to an embodiment of the present invention.

FIG. 8 shows a schematic diagram of a shielding structure 121 according to an embodiment of the present invention. In the embodiment shown in FIG. 8, the shielding structure 121 is a part of an upper surface of the turbine housing 120 that is close to the centre, wherein the fan is positioned inside the turbine housing 120 in the axial direction. In some embodiments, the shielding structure 121 may also be an independent structure. As shown in FIG. 2, because the upper surface of the turbine housing 120 adjoins the bottom part 214 of the surrounding structure 200, and the third opening 218 is arranged on the bottom part 214, the shielding structure 121 is located between the third opening 218 and the fan.

In the embodiment shown in FIG. 8, the shielding structure 121 comprises at least one opening 1211, irregularly distributed on the shielding structure 121 and used for air circulation (only two openings 1211 are marked representatively in FIG. 8). In some embodiments, the openings 1211 may also be regularly distributed. In some embodiments, the openings 1211 may be in fluid communication with at least a portion of the third openings 218. The shielding structure 121 can keep most of the noise generated by the fan isolated inside the turbine housing 120, while the opening 1211 for air circulation can convey some of the airflow generated by the fan to the power apparatus and/or control apparatus, to assist heat dissipation therefrom. The shielding structure 121 may be formed of a sound-absorbing material, or may be the same material as that of the housing.

Figure 9:
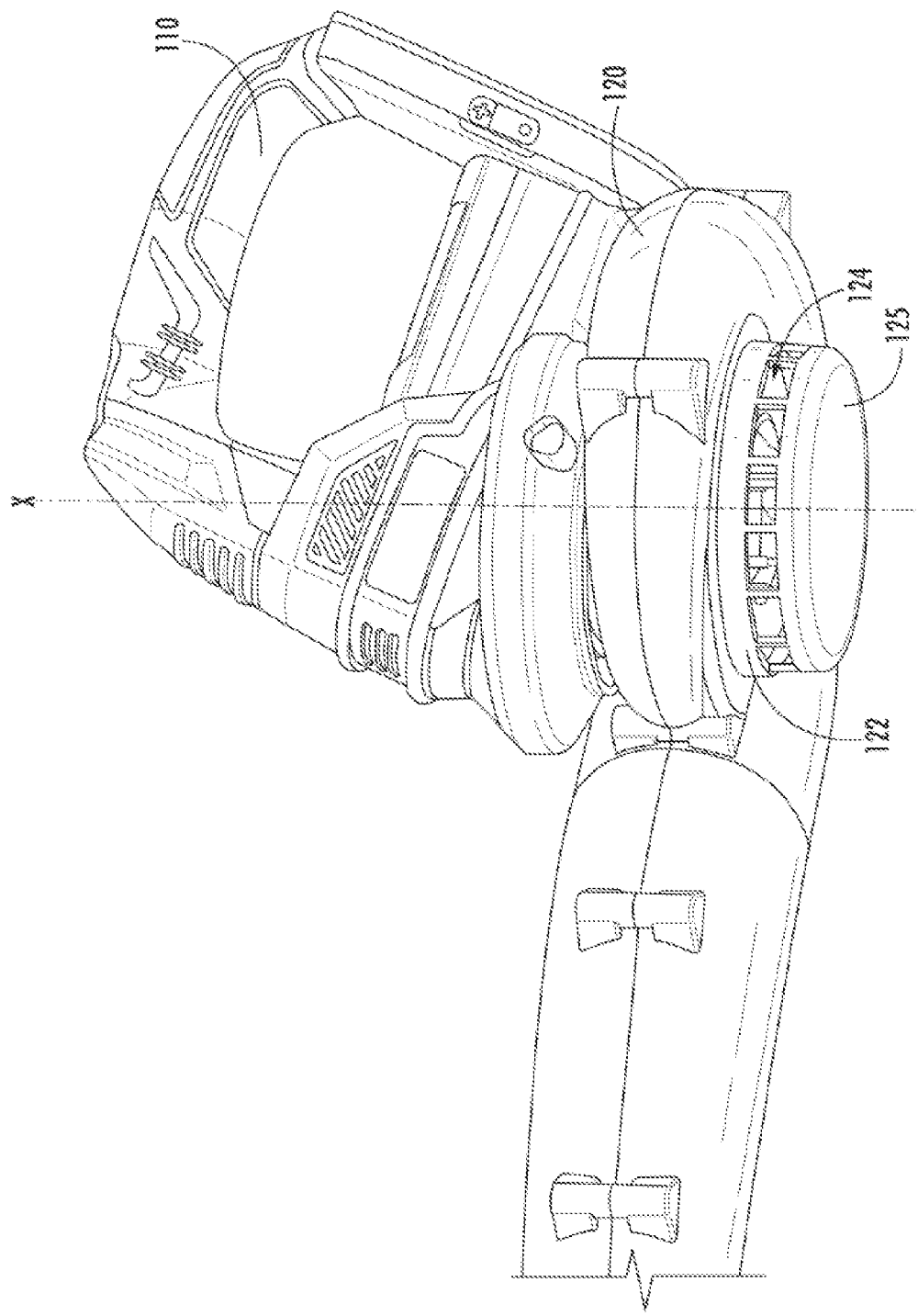
FIG. 9 shows a schematic diagram of an inlet assembly according to an embodiment of the present invention.

FIG. 9 shows a schematic diagram of an inlet assembly 122 according to an embodiment of the present invention. In the embodiment shown in FIG. 9, the inlet assembly 122 is substantially a cylinder. In some embodiments, the shape of the inlet assembly 122 is not limited to a cylinder. The cylinder comprises a circumference and a bottom face 125 extending in a plane perpendicular to the axis of the fan. In the embodiment shown in FIG. 9, the axis of the fan lies in the axial direction of the power apparatus. In some embodiments, the axis of the fan may be parallel to, or at an angle to, the axial direction of the power apparatus.

The inlet assembly 122 comprises at least one inlet 124 in fluid communication with the fan. In the embodiment shown in FIG. 9, multiple uniformly arranged inlets 124 are provided along the circumference of the inlet assembly 122 (only one of these inlets 124 is marked schematically in FIG. 9). In some embodiments, the inlets 124 may also be disposed at other positions, or be arranged in another form. The inlet assembly 122 may be arranged integrally with the turbine housing 120, or may be different components joined together. As can be seen from FIG. 9, the inlets 124 are not arranged on the bottom face 125 of the inlet assembly 122, instead being arranged on the circumference of the inlet assembly 122, such that the orientation of the at least one inlet 124 is arranged at an angle to the axis of the fan; this can further reduce noise. This angle is preferably 90 degrees, but may be another angle. In some embodiments, the inlet 124 may be arranged on the circumference of the inlet assembly 122, or on the bottom face 125, or on both. When the inlet assembly 122 is not a cylinder, the inlet 124 may also be arranged at other positions.

Figure 10:
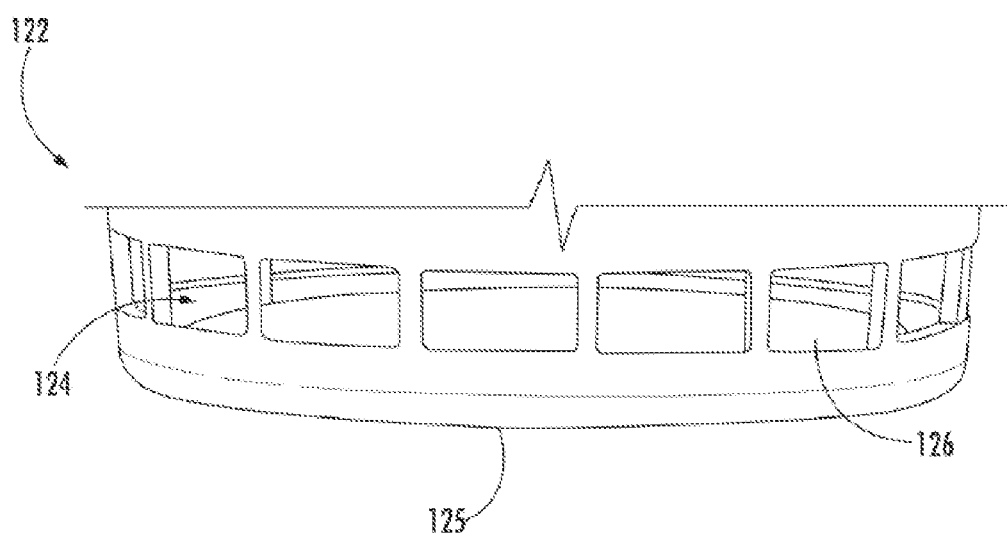
FIG. 10 shows a schematic diagram of the inlet assembly according to an embodiment of the present invention.

FIG. 10 shows a schematic diagram of the inlet assembly 122 according to an embodiment of the present invention. The inlet assembly 122 may comprise a sound-absorbing material 126. In the embodiment of FIG. 10, the sound-absorbing material 126 (the shaded part in the figure) is attached to an inner surface of the inlet assembly 122 opposite the bottom face 125. The sound-absorbing material 126 is arranged to absorb a certain amount of noise, without blocking the entry of air through the inlet 124. The sound-absorbing material 126 may be a porous material, such as sponge, etc. As shown in FIG. 10, a plane of extension of the sound-absorbing material 126 is parallel to the orientation of the at least one inlet 124. As will be understood, the plane of extension of the sound-absorbing material 126 and the orientation of the inlet 124 may be arranged at an acute angle. The acute angle may be a small angle. A small angle or zero angle can avoid blocking the entry of air. In some embodiments, the plane of extension of the sound-absorbing material 126 may also be arranged at right angles to the orientation of the inlet 124, achieving the effect of air filtration.

Figure 11:
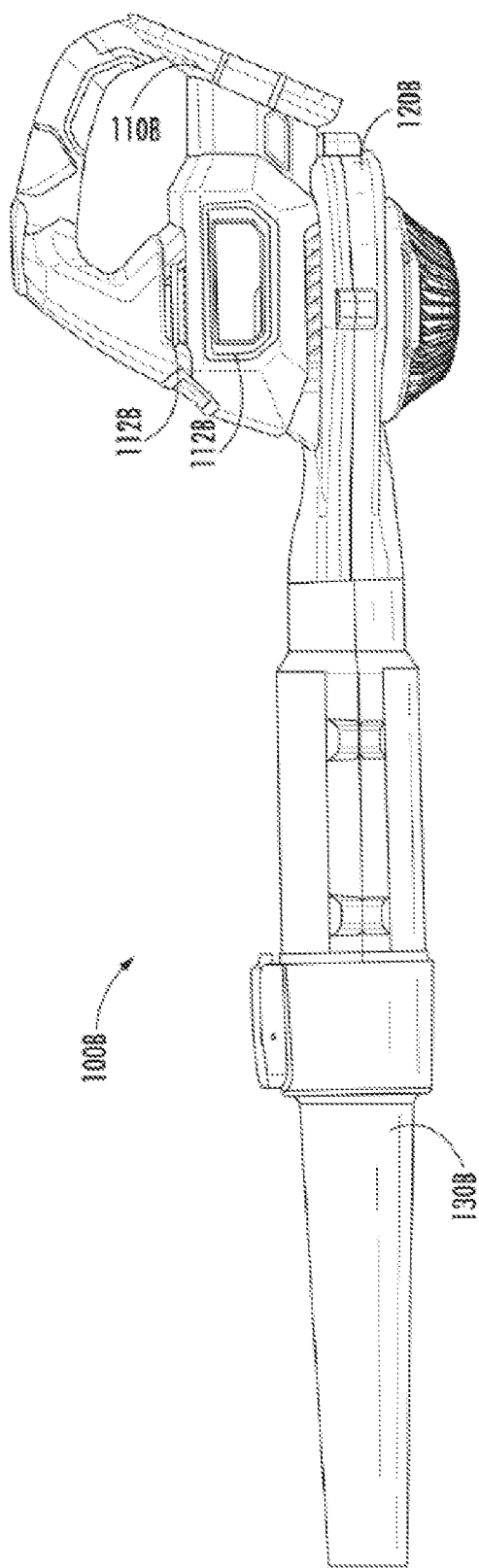
FIG. 11 shows a schematic diagram of an electric tool according to another embodiment of the present invention.
Figure 12:
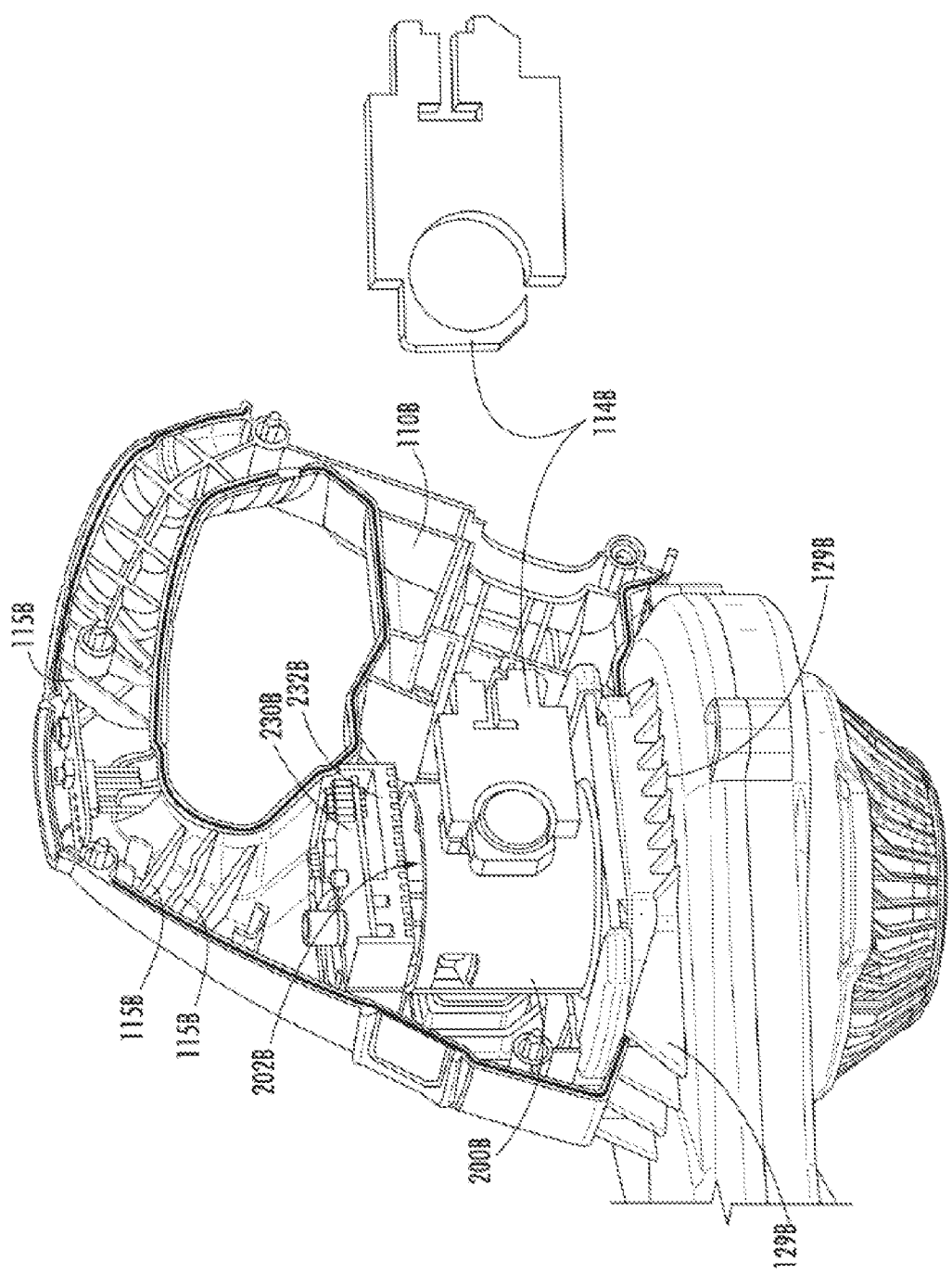
FIG. 12 shows a schematic diagram of another blocking structure according to an embodiment of the present invention.

FIG. 11 shows a schematic diagram of an electric tool according to another embodiment of the present invention, wherein similar features are not described again. In this embodiment, the electric tool is a centrifugal blower 100B, and working equipment is a fan 128B (FIG. 13); a power apparatus located in a main housing 110B and driving the fan 128B is a motor. A housing of the centrifugal blower 100B comprises the main housing 110B, a turbine housing 120B and a wind tube 130B. A first opening 112B is provided on the main housing 110B. The first opening 112B may serve as a ventilation port. In some embodiments, first openings 112B are arranged at two sides of a plane of symmetry of the electric tool. For example, as shown in FIG. 12, the first opening 112B may be arranged close to a cooling apparatus 232B. The first opening 112B may also be arranged close to a surrounding structure 200B. The cooling apparatus 232B is located above a second opening 202B of the surrounding structure 200B. As can be seen, the first opening 112B is arranged at an angle, preferably substantially at right angles, to the second opening 202B.

The blocking structure of the present invention may be provided in many ways. For example, the cooling apparatus 232B may have the function of a blocking structure, but an additional blocking structure may also be provided. FIG. 12 shows a schematic diagram of another blocking structure 114B according to an embodiment of the present invention. Half of the main housing 110B has been hidden, in order to show the internal structure thereof. The blocking structure 114B and an enlarged drawing thereof (the drawing at the right) are shown clearly in the figure. The blocking structure 114B is arranged at an inner side of the first opening 112B in FIG. 11, and is close to the first opening 112B. As can be seen from FIG. 12, the surrounding structure 200B located in the main housing 110B and at least partially surrounding the motor defines the second opening 202B which faces the cooling apparatus 232B and a circuit board 230B. The second opening 202B is substantially at right angles to the orientation of the first opening 112B. The blocking structure 114B is located between the first opening 112B and the second opening 202B. Similarly, another blocking structure 114B' (FIG. 14) may also be arranged at an inner side of a first opening (not shown) arranged on the other half-housing; this other blocking structure is located between the first opening on the other half-housing and the second opening 202B. The blocking structure 114B may be made of a sound-absorbing material, or a vibration-reducing material or another material. Unlike the embodiment of FIG. 3, in the embodiment of FIG. 12 the cooling apparatus 232B is closer to the second opening 202B than the circuit board 230B; such an arrangement is more favourable for heat dissipation. Similarly to the embodiment shown in FIG. 7, multiple baffles 115B are also provided inside the main housing 110B, and have substantially the same function. It will be understood that the quantities, orientations and positions of the components above are not restrictive.

Figure 13:
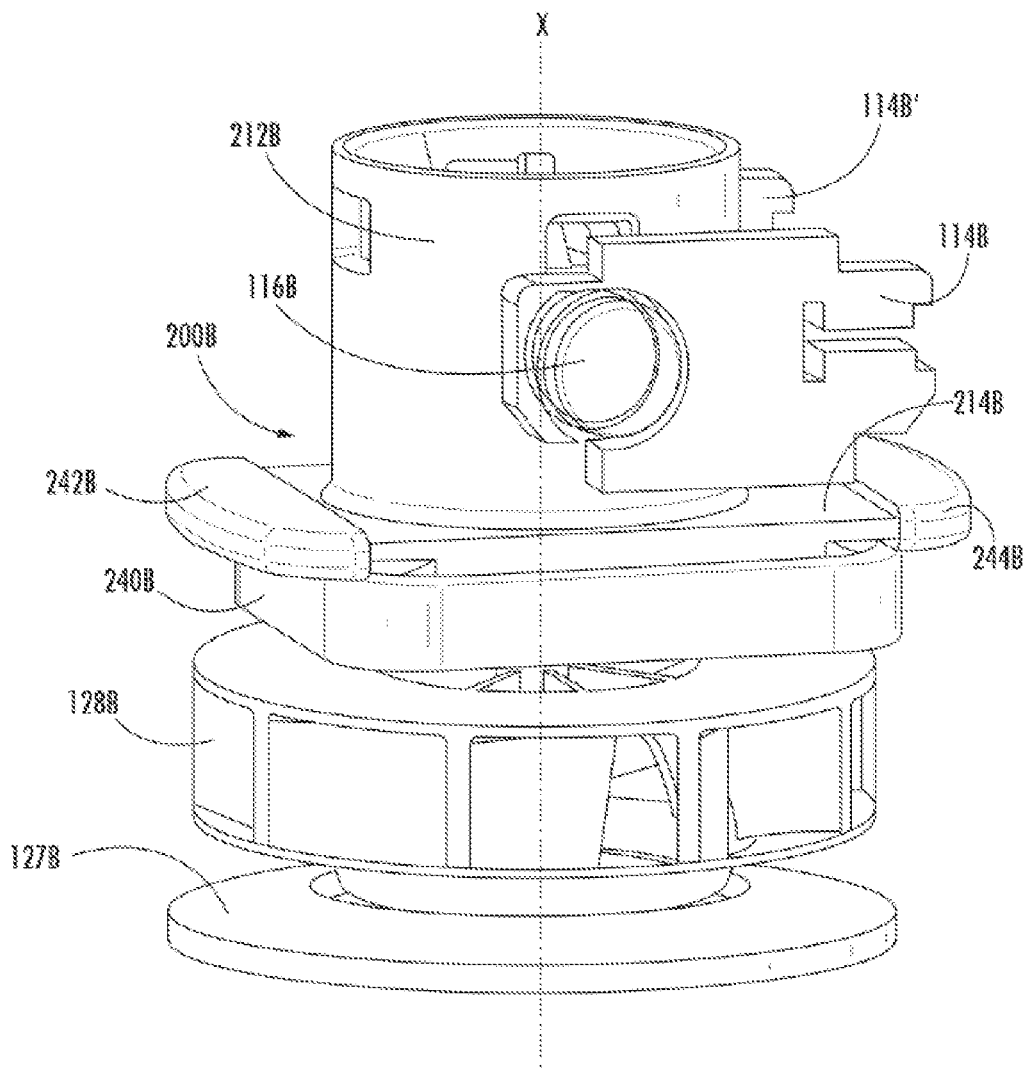
FIGS. 13 and 14 show an assembled diagram and an exploded diagram, respectively, of vibration-reducing members according to an embodiment of the present invention.
Figure 14:
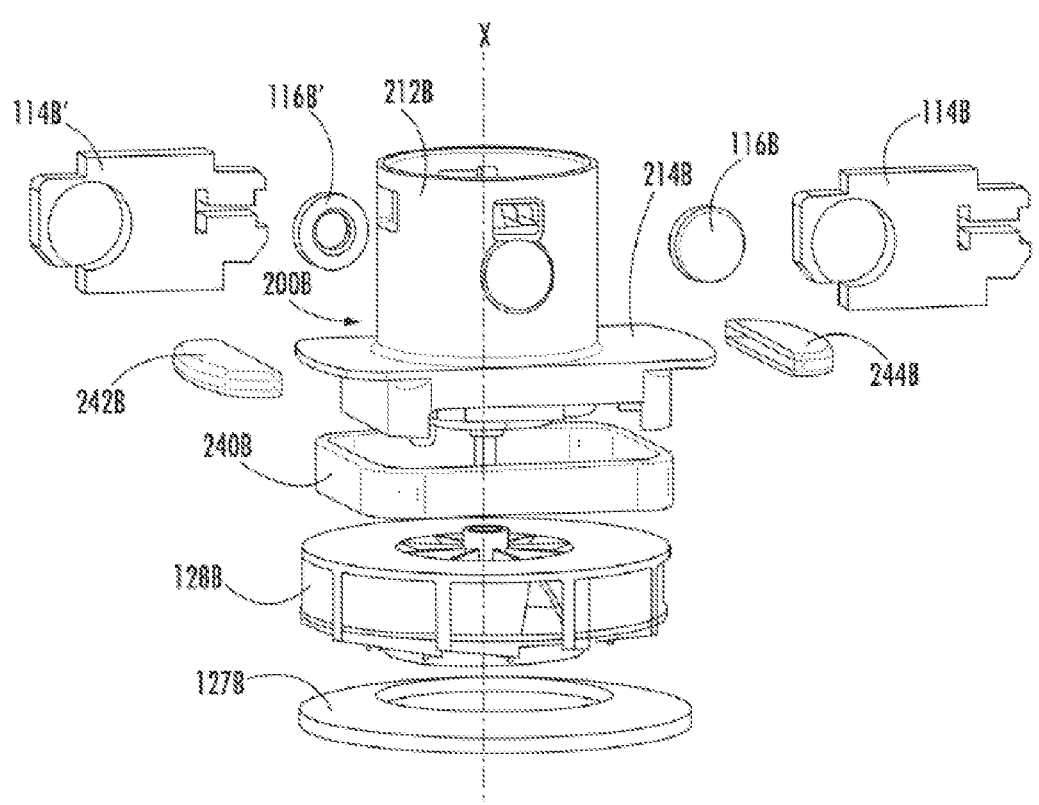
Figure 15:
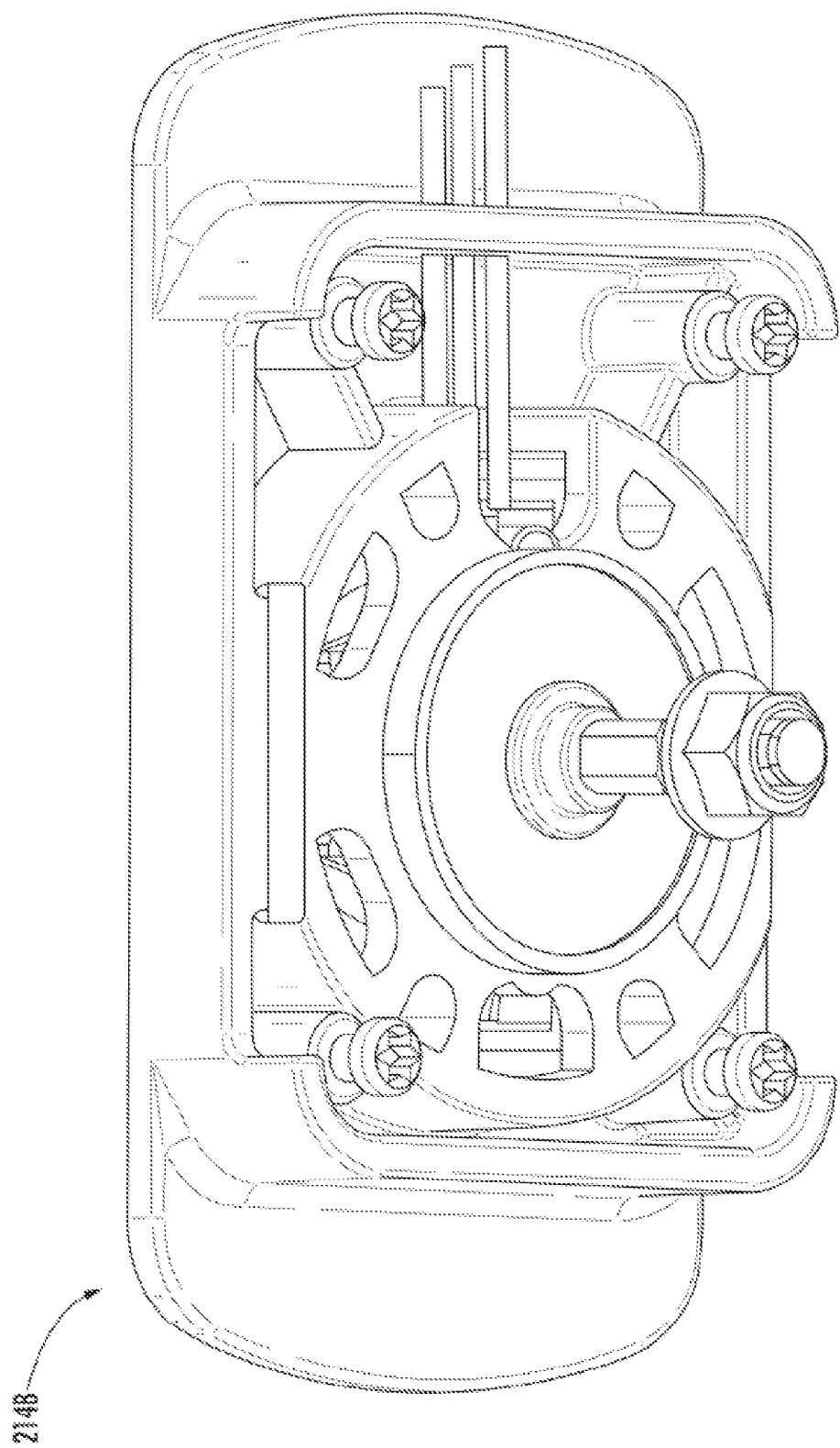
FIG. 15 shows a schematic diagram of a bottom part of the surrounding structure according to an embodiment of the present invention.

FIGS. 13 and 14 show an assembled diagram and an exploded diagram, respectively, of vibration-reducing members according to an embodiment of the present invention. FIG. 15 shows a schematic diagram of a bottom part 214B of the surrounding structure 200B according to an embodiment of the present invention. Referring to FIGS. 13-15, a peripheral face 212B of the surrounding structure 200B is substantially a cylinder. The blocking structure 114B may form part of a vibration-reducing member. A vibration-reducing member 116B and the blocking structure 114B are arranged between the peripheral face 212B of the surrounding structure 200B and the main housing 110B, and serve the functions of supporting the surrounding structure 200B and reducing vibration, and can further reduce noise. The bottom part 214B of the surrounding structure 200B forms a rectangular carrier having an upper part and a lower part; the fan 128B is fixed to the main housing 110B by means of the bottom part 214B. Relative to the lower part, the upper part extends to two sides in the direction of the longitudinal axis of the wind tube 130B in a plane perpendicular to the X axis. The extending parts are surrounded by vibration-reducing members 242B, 244B. Specifically, the vibration-reducing members 242B, 244B form two sheaths, which are fitted over the extending parts. A vibration-reducing member 240B surrounds the lower part of the bottom part 214B. Specifically, the vibration-reducing member 240B forms a rectangular sheath, which is fitted round a peripheral face of the lower part. The vibration-reducing members 240B, 242B, 244B are arranged between the bottom part 214B of the surrounding structure 200B and the main housing 110B. The vibration-reducing members 242B, 244B are engaged with structures on the inside of the main housing 110B; a peripheral face of the vibration-reducing member 240B adjoins the main housing 110B and the turbine housing 120B. The vibration-reducing members 240B, 242B, 244B simultaneously serve the functions of supporting the surrounding structure 200B and reducing vibration, and can further reduce noise. In addition, a vibration-reducing member 127B is arranged between the fan 128B and an inlet assembly 122B (FIG. 19), and serves the functions of supporting the fan 128B and reducing vibration, and can further reduce noise. Each vibration-reducing member may be of a material that is more elastic than the housing, or a sound-absorbing material, but is not limited to this. As will be understood, the quantities, shapes, positions, orientations and materials of the components above are not restrictive; any vibration-reducing member arranged between the surrounding structure 200B and the housing or vibration-reducing member arranged between the fan 128B and the inlet assembly 122B is included in the scope of the present invention.

Figure 16:
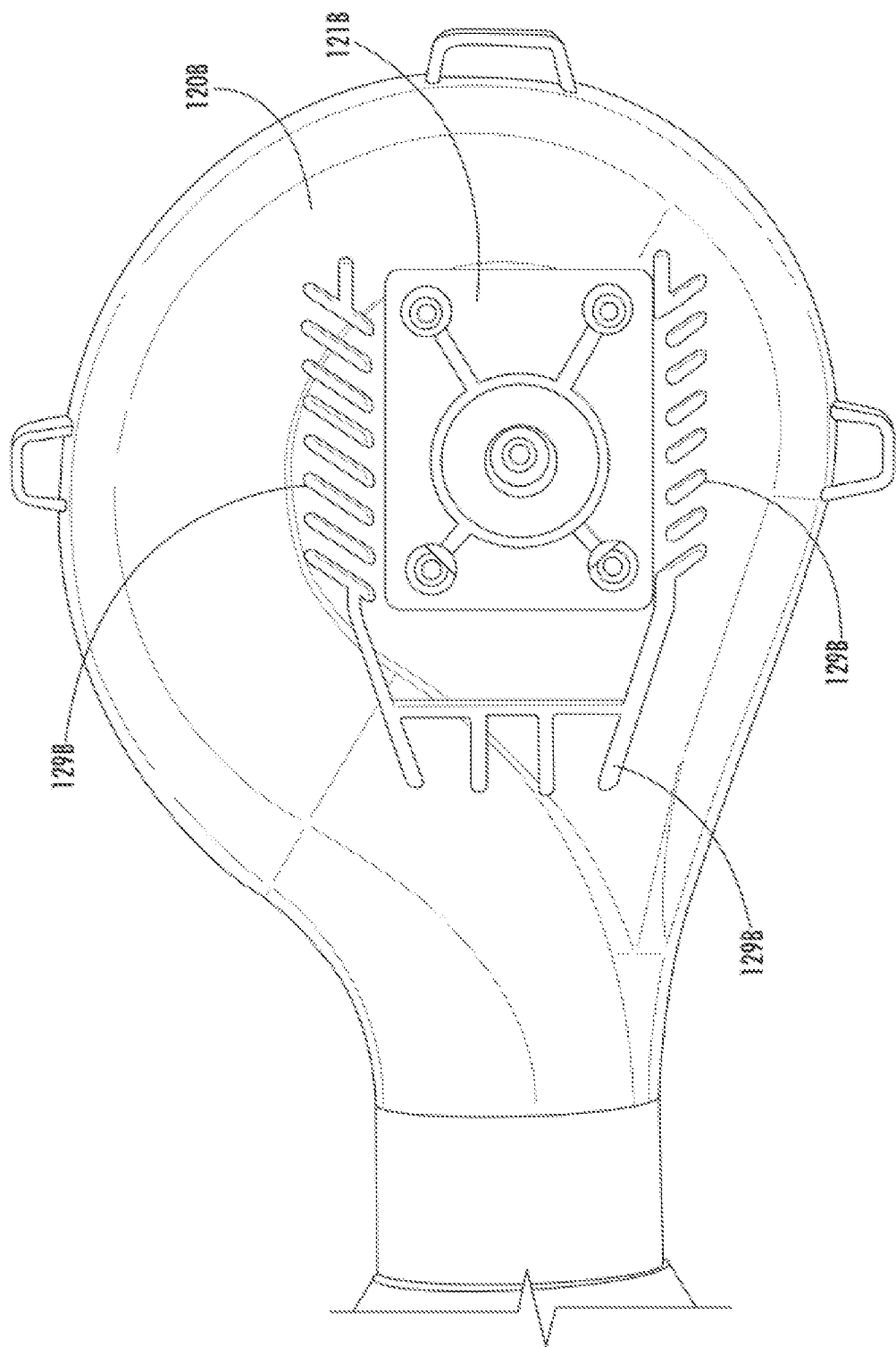
FIGS. 16 and 17 show a top view and a front view, respectively, of supporting ribs according to an embodiment of the present invention.
Figure 17:
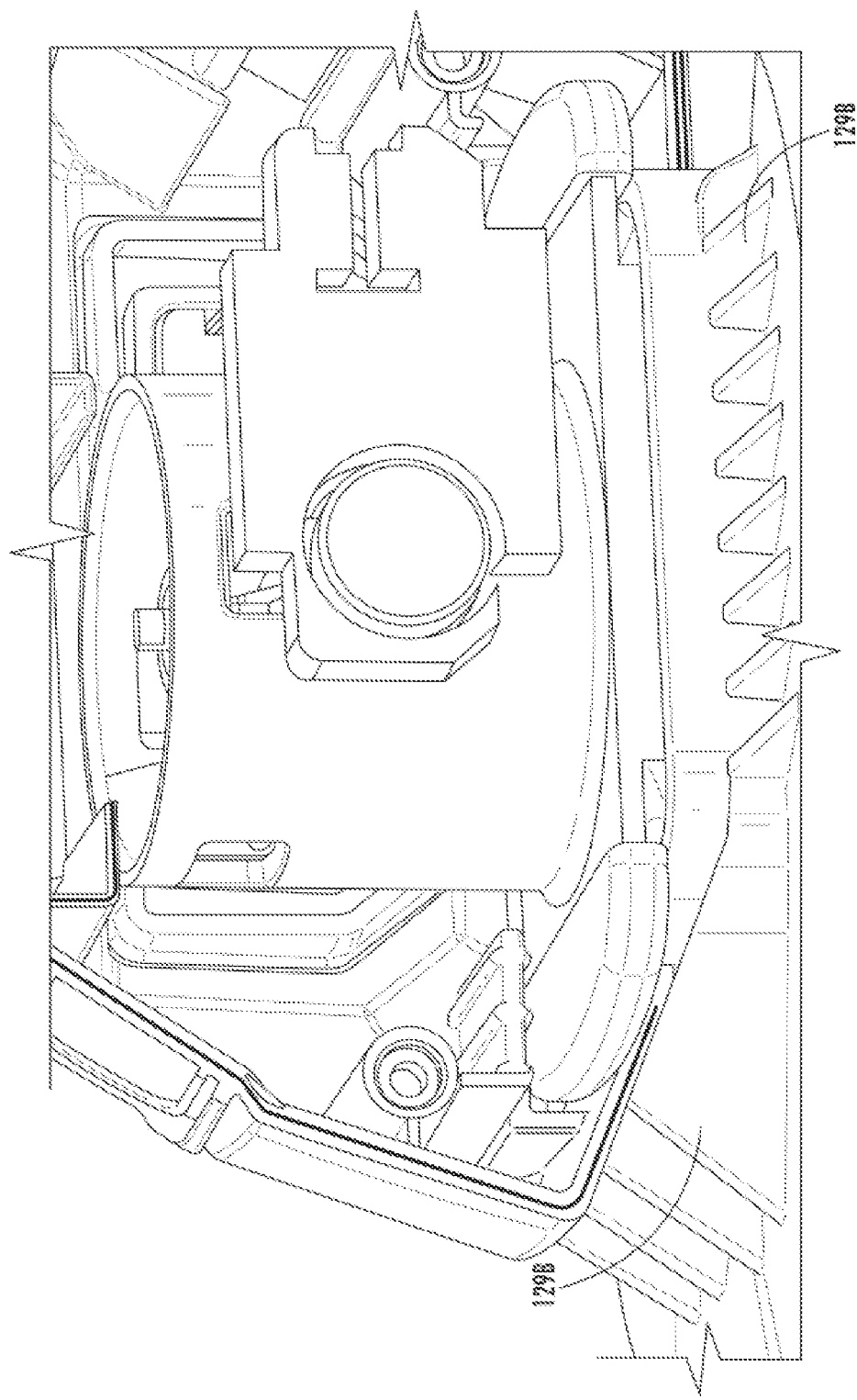

FIGS. 16 and 17 show a top view and a front view, respectively, of supporting ribs 129B according to an embodiment of the present invention. Referring to FIGS. 12, 16 and 17, one or more supporting ribs 129B may be provided at the periphery of a shielding structure 121B of an upper surface of the turbine housing 120B, i.e. at the boundary between the turbine housing 120B and the main housing 110B; the supporting ribs 129B may be integrally formed with the upper surface of the turbine housing 120B, or provided independently. As shown in FIG. 12, some of the supporting ribs 129B directly adjoin the main housing 110B, and some of the supporting ribs 129B adjoin the vibration-reducing member 240B. As shown in FIG. 16, the supporting ribs 129B shown in the top view may be arranged parallel to each other or form a certain angle with each other, and the supporting ribs 129B may be arranged substantially in a radial direction of the drive shaft of the motor or be inclined at a certain angle overall. As shown in FIG. 17, each supporting rib 129B may be substantially triangular; a triangular stabilizing structure can reduce vibration and increase the strength of support, and can further reduce noise. As will be understood, the quantity, shape, position, orientation and material of the supporting ribs 129B are not restrictive.

Figure 18:
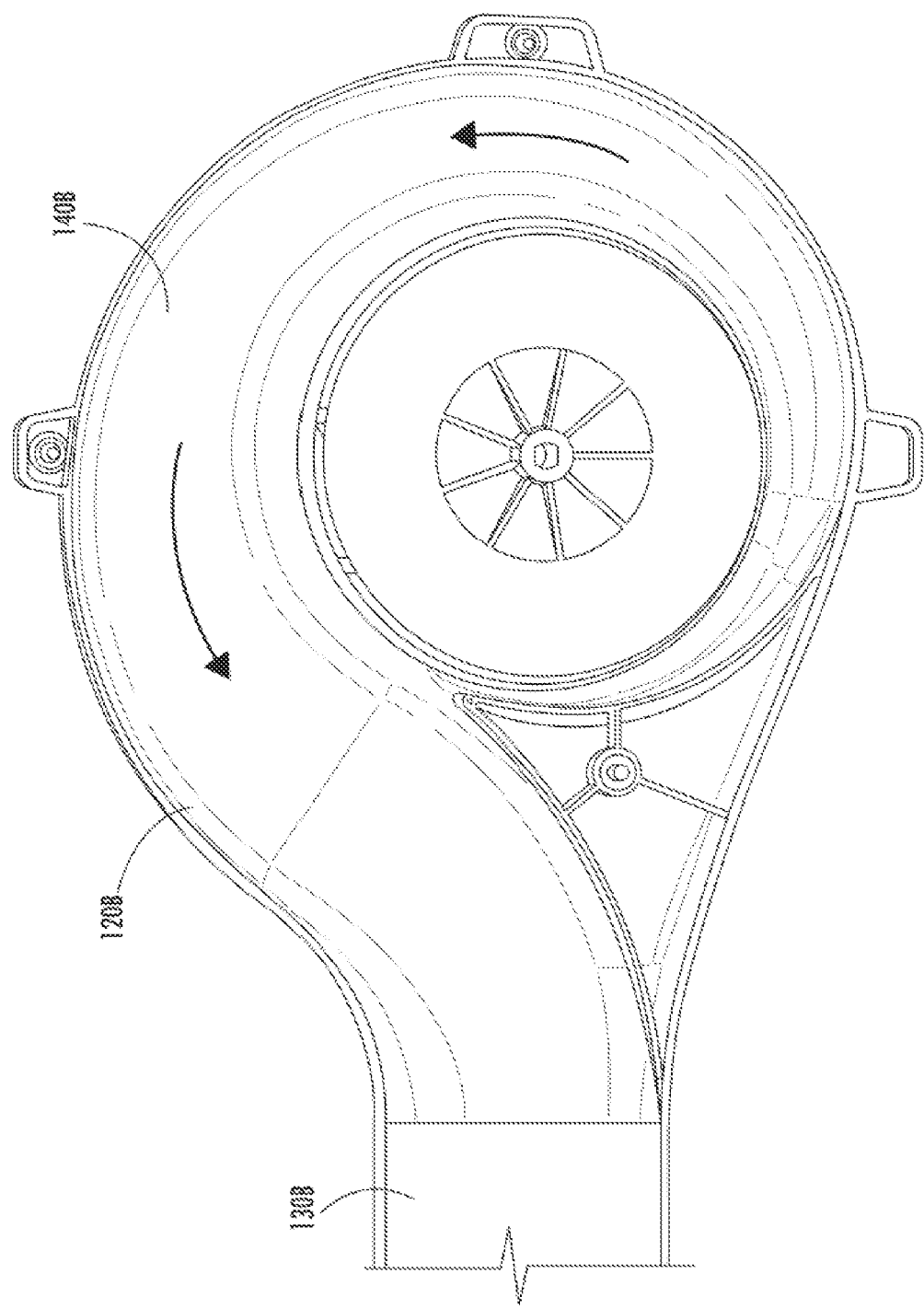
FIG. 18 shows a top view of a wind path inside a turbine housing according to an embodiment of the present invention.

FIG. 18 shows a top view of a wind path 140B inside the turbine housing 120B according to an embodiment of the present invention. The cross-sectional area of the wind path 140B gradually increases in the circumferential direction of the drive shaft of the motor, in the direction of flow of an airstream (as shown by the arrows); the cross-sectional area of the wind path 140B reaches a maximum at a position close to the wind tube 130B. The cross-sectional area of the wind path 140B may be round or elliptical, etc.

Figure 19:
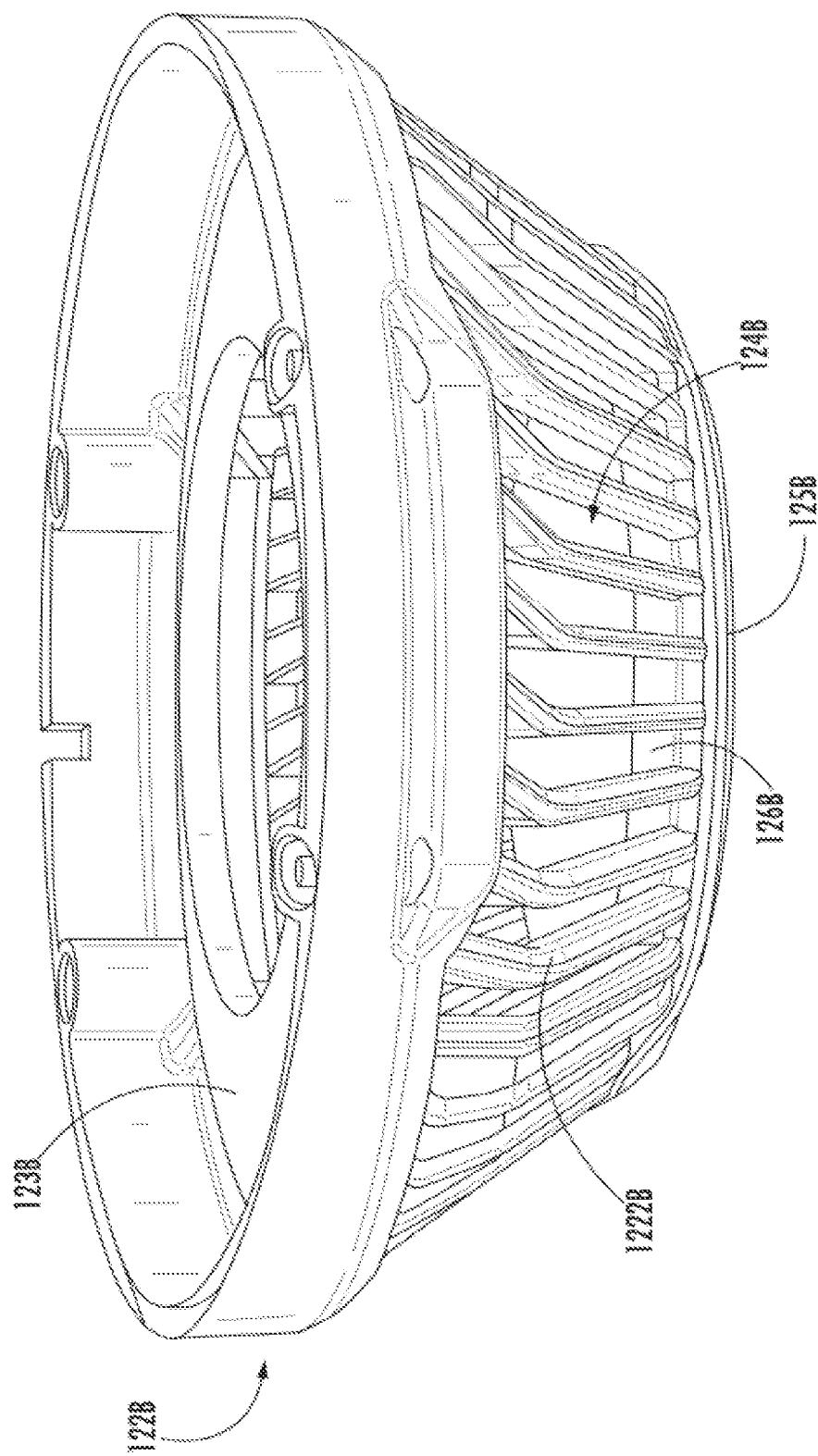
FIGS. 19 and 20 show schematic diagrams of the inlet assembly according to an embodiment of the present invention.
Figure 20:
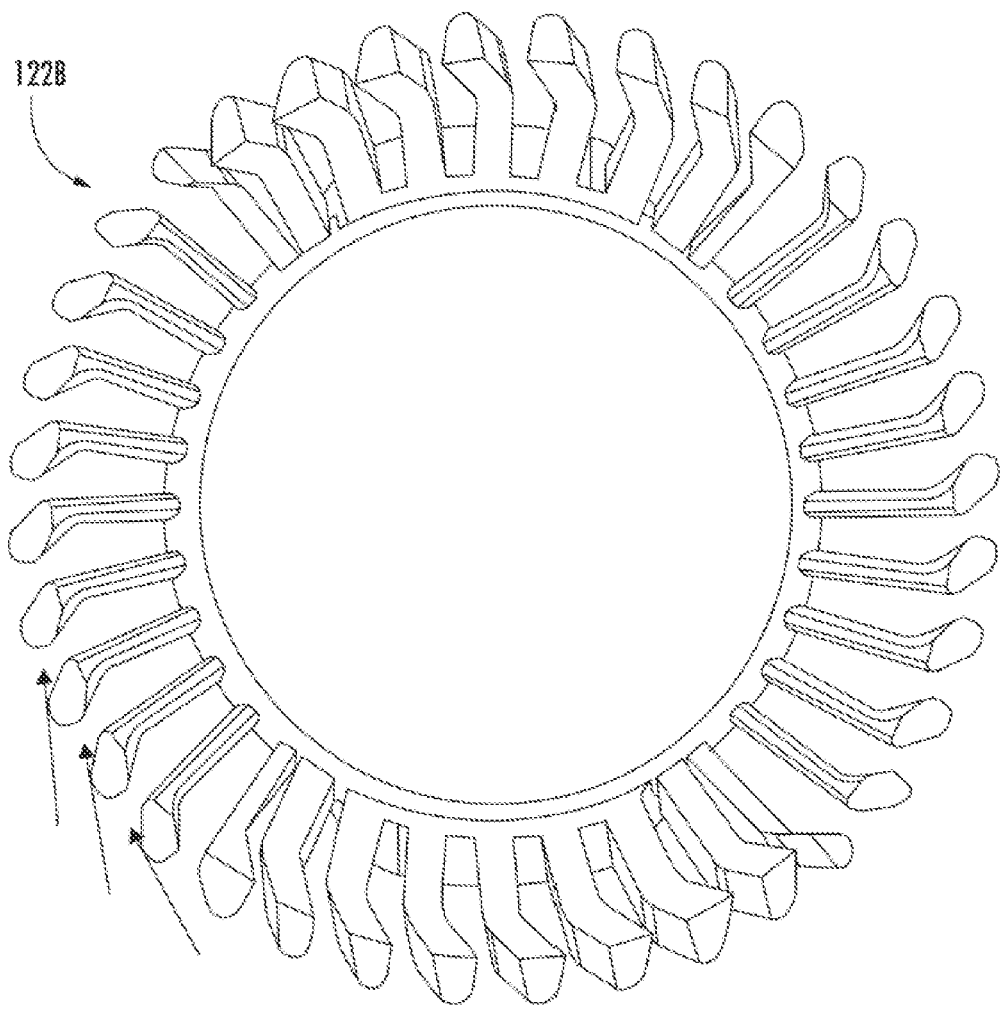

FIGS. 19 and 20 show schematic diagrams of the inlet assembly 122B according to an embodiment of the present invention. The inlet assembly 122B is substantially an inverted truncated cone, and comprises a peripheral face and a bottom face 125B which extends in a plane perpendicular to the axis of the fan 128B. A first sound-absorbing material 126B is attached to the side of the bottom face 125B that is located inside the inlet assembly 122B; this is substantially the same as in the embodiment shown in FIG. 10. In addition, a second sound-absorbing material 123B is arranged at the inside top of the inlet assembly 122B, being located between the inlet assembly 122B and a bottom part of the turbine housing 120B. The second sound-absorbing material 123B may also optionally serve a vibration reduction and/or sealing function, to prevent the transmission of vibration of the motor and the fan 128B to the inlet assembly 122B, and/or prevent leakage of air at the junction of the inlet assembly 122B and the turbine housing 120B. In some embodiments, the second sound-absorbing material 123B may be the same component as the vibration-reducing member 127B in FIGS. 13 and 14. The inlet assembly 122B comprises at least one inlet 124B, which is located at the peripheral face and in fluid communication with the fan 128B. The orientation of the at least one inlet 124B is at an angle, preferably substantially 90 degrees, to the axis of the fan 128B; this causes at least some of the sound waves from the fan 128B to reach the sound-absorbing material before passing through the inlet 124B. In some embodiments, the at least one inlet 124B comprises multiple inlets 124B arranged along a circumference, which are defined by multiple adjacent blades 1222B. Each blade 1222B may have a specific configuration so as to partially or completely define the angle and direction of the airstream entering the inlets 124B. In some embodiments, the multiple blades 1222B are arranged along the circumference, each blade 1222B being constructed and oriented so that incoming air enters the inlet assembly 122B substantially in the direction of tangents to the circumference (as shown by the three exemplary arrows in FIG. 20). As will be understood, the quantities, shapes, positions, orientations and materials of the components above are not restrictive.

While the present invention has been illustrated and described in detail above in conjunction with the drawings, the description should be regarded as illustrative rather than restrictive; it should be understood that only exemplary embodiments are shown and described, and that they do not limit the present invention in any way. It is understandable that any characteristic described herein may be used in any embodiment. The illustrative embodiments do not exclude each other or exclude other embodiments not listed herein. Therefore, the present invention further provides a combination of one or more of the above-described exemplary embodiments. Modifications and variations may be made to the present invention without departing from the spirit or scope thereof. Therefore, such restrictions should be imposed only as indicated by the appended claims.

The invention claimed is:

1. An electric tool, wherein the electric tool comprises:
a housing, comprising a first opening through an exterior surface of the housing;
working equipment, the working equipment being selected from the group consisting of:

a centrifugal fan, an axial fan, a cutter, and a drill;

a motor, at least partially located in the housing and driving the working equipment;

a surrounding structure, located in the housing and at least partially surrounding the motor, the surrounding structure defining a second opening, the first opening and the second opening having different orientations; and a blocking structure located between the first opening and the second opening such that air can go around the periphery of the blocking structure and through the first opening, the blocking structure being configured to substantially block any direct pathway for noise generated by the working equipment and/or the motor through the first opening and the second opening, wherein the blocking structure does not form part of the exterior surface of the housing.

2. The electric tool as claimed in claim 1, wherein the orientation of the first opening is at right angles to the orientation of the second opening.

3. The electric tool as claimed in claim 1, wherein the first opening is a ventilation port.

4. The electric tool as claimed in claim 1, wherein the blocking structure is located at an inner side of the first opening.

5. The electric tool as claimed in claim 1, wherein the blocking structure is arranged closer to the first opening than to the second opening.

6. The electric tool as claimed in claim 1, wherein the housing comprises multiple baffles located in the interior thereof.

7. The electric tool as claimed in claim 1, wherein the surrounding structure surrounds the motor circumferentially.

8. The electric tool as claimed in claim 7, wherein a height of the surrounding structure is greater than a height of the motor.

9. The electric tool as claimed in claim 1, wherein the electric tool further comprises control apparatus located close to the second opening.

10. The electric tool as claimed in claim 1, wherein a maximum dimension of the control apparatus is larger than a dimension of the second opening.

11. The electric tool as claimed in claim 10, wherein the control apparatus comprises a control circuit board and a cooling apparatus having the control circuit board mounted thereon, and a maximum dimension of the cooling apparatus is larger than a dimension of the second opening.

12. The electric tool as claimed in claim 1, wherein the working equipment is fixed to the housing by means of the surrounding structure.

13. The electric tool as claimed in claim 12, wherein at least one of the surrounding structure, the blocking structure and a vibration-reducing member is formed of a sound-absorbing material.

14. The electric tool as claimed in claim 1, further comprising an inlet assembly, the inlet assembly comprising at least one inlet in fluid communication with the working equipment, the at least one inlet being oriented at an angle to an axis of the working equipment.

15. The electric tool as claimed in claim 14, wherein the at least one inlet comprises multiple inlets arranged along a circumference, each of the multiple inlets being formed between multiple adjacent blades.

16. The electric tool as claimed in claim 15, wherein the multiple adjacent blades are arranged along the circumference and constructed so that an air stream enters the inlet assembly substantially in the direction of a tangent to the circumference.

17. The electric tool as claimed in claim 14, wherein the inlet assembly comprises a bottom face extending in a plane perpendicular to an axis of the working equipment.

18. The electric tool as claimed in claim 17, wherein the bottom face comprises a sound-absorbing material.

19. The electric tool as claimed in claim 1, wherein the electric tool is a centrifugal blower.

20. An electric tool, wherein the electric tool comprises:

a housing, comprising a first opening;

working equipment, the working equipment being selected from the group consisting of: a centrifugal fan, an axial fan, a cutter, and a drill;

a motor, at least partially located in the housing and driving the working equipment;

a surrounding structure, located in the housing and at least partially surrounding the motor, the surrounding structure defining a second opening, the first opening and the second opening having different orientations; and a blocking structure located between the first opening and the second opening such that air can go around the periphery of the blocking structure and through the first opening, the blocking structure being configured to block a direct pathway for noise generated by the working equipment and/or the motor through the first opening and the second opening, wherein the blocking structure is arranged substantially parallel to a housing outer surface through which the first opening is formed.

* * * * *